United States Patent
Alexander et al.

(10) Patent No.: US 11,425,802 B2
(45) Date of Patent: *Aug. 23, 2022

(54) LIGHTING SYSTEM AND METHOD

(71) Applicant: LIFI Labs, Inc., San Francisco, CA (US)

(72) Inventors: Marc Alexander, San Francisco, CA (US); John Cameron, San Francisco, CA (US)

(73) Assignee: LIFI Labs, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/159,434

(22) Filed: Jan. 27, 2021

(65) Prior Publication Data
US 2021/0153318 A1 May 20, 2021

Related U.S. Application Data

(63) Continuation of application No. 16/548,319, filed on Aug. 22, 2019, now Pat. No. 10,952,296, which is a (Continued)

(51) Int. Cl.
*H05B 45/10* (2020.01)
*F21S 2/00* (2016.01)
(Continued)

(52) U.S. Cl.
CPC .............. *H05B 45/10* (2020.01); *F21S 2/005* (2013.01); *G06F 3/041* (2013.01);
(Continued)

(58) Field of Classification Search
CPC ........ H05B 45/10; H05B 45/20; H05B 47/19; H05B 47/21; H05B 47/10; H05B 47/105;
(Continued)

(56) References Cited

U.S. PATENT DOCUMENTS 4,942,386 A 7/1990 Willis
5,420,607 A 5/1995 Miller et al.
(Continued)

FOREIGN PATENT DOCUMENTS

CN 101897236 A 11/2010
CN 201986217 U 9/2011
(Continued)

OTHER PUBLICATIONS

Boost Your Sales Immediately. Add an LED Display From Cirrus, https://cirrusled.com/.
(Continued)

*Primary Examiner* — Abdullah A Riyami
*Assistant Examiner* — Syed M Kaiser
(74) *Attorney, Agent, or Firm* — Jeffrey Schox; Diana Lin

(57) ABSTRACT

A controllable dynamic lighting system including a lighting element device with a set of controllable zone and a controlling means. A method for controlling a lighting system including: receiving lighting system operation inputs, determining operation instructions for one more controllable zones based on the operation inputs, and controlling controllable zone operation based on the respective operation instructions.

20 Claims, 17 Drawing Sheets

Related U.S. Application Data continuation of application No. 15/801,600, filed on Nov. 2, 2017, now Pat. No. 10,440,794.

(60) Provisional application No. 62/455,391, filed on Feb. 6, 2017, provisional application No. 62/416,980, filed on Nov. 3, 2016, provisional application No. 62/416,330, filed on Nov. 2, 2016.

(51) Int. Cl.
*G06F 3/04883* (2022.01)
*H05B 45/20* (2020.01)
*H05B 47/175* (2020.01)
*G06F 3/041* (2006.01)
*H05B 47/19* (2020.01)
*H05B 47/195* (2020.01)

(52) U.S. Cl.
CPC ......... *G06F 3/04883* (2013.01); *H05B 45/20* (2020.01); *H05B 47/175* (2020.01); *H05B 47/19* (2020.01); *H05B 47/195* (2020.01)

(58) Field of Classification Search
CPC ...... H05B 47/11; G09G 3/002; G09G 3/2003; G09G 3/2096; H04N 9/77; H04N 9/69; H04N 9/73; H04N 9/643; G06F 3/04883; F21S 2/005
See application file for complete search history.

(56) References Cited

U.S. PATENT DOCUMENTS

| | | | |
|---|---|---|---|
| 5,506,946 A * | 4/1996 | Bar | G06T 11/001 345/600 |
| 5,710,545 A | 1/1998 | Dunn | |
| 5,769,527 A | 6/1998 | Taylor et al. | |
| 5,790,114 A | 8/1998 | Geaghan et al. | |
| 5,841,428 A | 11/1998 | Jaeger et al. | |
| 5,914,669 A | 6/1999 | Wicks et al. | |
| 6,003,206 A | 12/1999 | Hall et al. | |
| 6,121,976 A | 9/2000 | Lu | |
| 6,329,990 B1 | 12/2001 | Lapstun et al. | |
| 6,337,629 B1 | 1/2002 | Bader | |
| 6,624,368 B2 | 9/2003 | Sato et al. | |
| 6,694,125 B2 | 2/2004 | White et al. | |
| 6,726,112 B1 | 4/2004 | Ho | |
| 6,759,966 B1 | 7/2004 | Weng | |
| 6,949,885 B2 | 9/2005 | Hamamoto et al. | |
| 7,103,460 B1 | 9/2006 | Breed | |
| 7,205,495 B2 | 4/2007 | Mazur | |
| 7,221,271 B2 | 5/2007 | Reime | |
| 7,339,128 B2 | 3/2008 | Yen | |
| 7,418,392 B1 | 8/2008 | Mozer et al. | |
| 7,446,671 B2 | 11/2008 | Giannopoulos et al. | |
| 7,474,632 B2 | 1/2009 | Ban | |
| 7,502,033 B1 | 3/2009 | Axelrod | |
| 7,573,208 B2 | 8/2009 | Newman | |
| 7,597,455 B2 | 10/2009 | Smith et al. | |
| 7,598,885 B2 | 10/2009 | Kwon et al. | |
| 7,667,163 B2 | 2/2010 | Ashworth et al. | |
| 7,852,322 B2 | 12/2010 | Park | |
| 7,859,398 B2 | 12/2010 | Davidson et al. | |
| 7,884,556 B2 | 2/2011 | Gandhi | |
| 7,952,322 B2 | 5/2011 | Partovi et al. | |
| 7,980,726 B2 | 7/2011 | Joosen et al. | |
| 8,013,545 B2 | 9/2011 | Jonsson | |
| 8,024,517 B2 | 9/2011 | Lafrese et al. | |
| 8,033,686 B2 | 10/2011 | Recker et al. | |
| 8,035,320 B2 | 10/2011 | Sibert | |
| 8,100,552 B2 | 1/2012 | Spero | |
| 8,115,369 B2 | 2/2012 | Kang et al. | |
| 8,160,514 B2 | 4/2012 | Aparin et al. | |
| 8,195,313 B1 | 6/2012 | Fadell et al. | |
| 8,207,821 B2 | 6/2012 | Roberge et al. | |
| 8,253,344 B2 | 8/2012 | Guest et al. | |
| 8,282,250 B1 | 10/2012 | Dassanayake et al. | |
| 8,294,379 B2 | 10/2012 | Liu et al. | |
| 8,299,719 B1 | 10/2012 | Moshirnoroozi | |
| 8,314,566 B2 | 11/2012 | Steele et al. | |
| 8,334,777 B2 | 12/2012 | Wilson et al. | |
| 8,373,360 B2 | 2/2013 | Leung et al. | |
| 8,390,201 B2 | 3/2013 | Yasuda et al. | |
| 8,390,207 B2 | 3/2013 | Dowling et al. | |
| 8,433,530 B2 | 4/2013 | Shimada et al. | |
| 8,446,288 B2 | 5/2013 | Mizushima et al. | |
| 8,491,159 B2 | 7/2013 | Recker et al. | |
| 8,523,410 B2 | 9/2013 | Hashimoto et al. | |
| 8,562,158 B2 | 10/2013 | Chien | |
| 8,581,512 B2 | 11/2013 | Hamamoto et al. | |
| 8,593,073 B2 | 11/2013 | Aldrich et al. | |
| 8,641,241 B2 | 2/2014 | Farmer | |
| 8,669,716 B2 | 3/2014 | Recker et al. | |
| 8,723,434 B2 | 5/2014 | Watson et al. | |
| 8,723,794 B2 | 5/2014 | Corson et al. | |
| 8,742,594 B2 | 6/2014 | Daubenspeck et al. | |
| 8,742,694 B2 | 6/2014 | Bora et al. | |
| 8,743,023 B2 | 6/2014 | Maxik et al. | |
| 8,743,923 B2 | 6/2014 | Geske et al. | |
| 8,755,561 B2 | 6/2014 | Vlutters et al. | |
| 8,760,370 B2 | 6/2014 | Maxik et al. | |
| 8,760,514 B2 | 6/2014 | Chien | |
| 8,764,251 B2 | 7/2014 | Lien | |
| 8,770,771 B2 | 7/2014 | Preta et al. | |
| 8,788,966 B2 | 7/2014 | Josephson et al. | |
| 8,812,827 B2 | 8/2014 | Malasani | |
| 8,820,984 B2 | 9/2014 | Gillio | |
| 8,829,799 B2 | 9/2014 | Recker et al. | |
| 8,834,009 B2 | 9/2014 | Chien | |
| 8,854,443 B2 * | 10/2014 | Kryger Nielsen | H05B 47/10 348/65 |
| 8,858,029 B2 | 10/2014 | Brandes et al. | |
| 8,888,306 B2 | 11/2014 | Thomas et al. | |
| 8,890,435 B2 | 11/2014 | Bora et al. | |
| 8,902,049 B2 | 12/2014 | Fushimi et al. | |
| 8,928,232 B2 | 1/2015 | Aggarwal et al. | |
| 8,941,013 B2 | 1/2015 | Arnold | |
| 8,947,013 B2 | 2/2015 | Sutardja et al. | |
| 8,960,940 B2 | 2/2015 | Hellkamp | |
| 8,981,913 B2 | 3/2015 | Henig et al. | |
| 8,994,276 B2 | 3/2015 | Recker et al. | |
| 9,024,517 B2 | 5/2015 | Yuan et al. | |
| 9,030,120 B2 | 5/2015 | Pickard et al. | |
| 9,039,233 B2 | 5/2015 | Fournier et al. | |
| 9,049,756 B2 | 6/2015 | Klusmann et al. | |
| 9,074,736 B2 | 7/2015 | Recker et al. | |
| 9,080,758 B2 | 7/2015 | Igaki et al. | |
| 9,113,528 B2 | 8/2015 | Bora et al. | |
| 9,172,917 B1 | 10/2015 | Fu et al. | |
| 9,192,032 B2 | 11/2015 | Kwag et al. | |
| 9,247,625 B2 | 1/2016 | Recker et al. | |
| 9,253,859 B2 | 2/2016 | Chung | |
| 9,326,359 B2 | 4/2016 | Bosua | |
| 9,338,864 B2 | 5/2016 | Bosua et al. | |
| 9,345,098 B2 | 5/2016 | Joseph et al. | |
| 9,351,378 B2 | 5/2016 | Aggarwal et al. | |
| 9,368,695 B2 | 6/2016 | David et al. | |
| 9,404,624 B2 | 8/2016 | Chung | |
| 9,408,282 B1 | 8/2016 | Springer | |
| 9,410,664 B2 | 8/2016 | Krames et al. | |
| 9,497,819 B2 | 11/2016 | Van De Sluis et al. | |
| 9,510,426 B2 | 11/2016 | Chemel et al. | |
| 9,526,151 B2 | 12/2016 | Kreiner et al. | |
| 9,534,773 B1 | 1/2017 | Turudic | |
| 9,538,619 B2 | 1/2017 | Swatsky et al. | |
| 9,578,722 B2 | 2/2017 | Feng et al. | |
| 9,651,243 B1 | 5/2017 | Springer | |
| 9,677,755 B1 | 6/2017 | Linnell et al. | |
| 9,696,200 B2 | 7/2017 | Ramer et al. | |
| 9,699,871 B2 | 7/2017 | Karc et al. | |
| 9,801,260 B2 | 10/2017 | Anthony et al. | |
| 9,936,566 B2 | 4/2018 | Alexander et al. | |
| 10,047,912 B2 | 8/2018 | Bosua et al. | |
| 10,085,331 B2 | 9/2018 | Alexander et al. | |

(56) References Cited

U.S. PATENT DOCUMENTS

| | | | |
|---|---|---|---|
| 10,129,937 B1 | 11/2018 | Lin et al. | |
| 10,129,965 B2 | 11/2018 | Bosua et al. | |
| 10,136,292 B2 | 11/2018 | Bosua et al. | |
| 10,274,160 B2 | 4/2019 | Parker et al. | |
| 10,304,901 B1* | 5/2019 | Xu | G09G 3/2003 |
| 10,440,794 B2* | 10/2019 | Alexander | H05B 45/20 |
| 2002/0047628 A1 | 4/2002 | Morgan et al. | |
| 2002/0111135 A1 | 8/2002 | White et al. | |
| 2002/0145394 A1 | 10/2002 | Morgan et al. | |
| 2003/0019734 A1 | 1/2003 | Sato et al. | |
| 2003/0117408 A1 | 6/2003 | Forsline et al. | |
| 2004/0105264 A1 | 6/2004 | Spero | |
| 2004/0129946 A1 | 7/2004 | Nagai et al. | |
| 2005/0116667 A1* | 6/2005 | Mueller | G09F 19/22 315/312 |
| 2005/0236263 A1 | 10/2005 | Mazur | |
| 2005/0237341 A1 | 10/2005 | Gangnet et al. | |
| 2005/0278778 A1 | 12/2005 | D et al. | |
| 2006/0002309 A1 | 1/2006 | Ban | |
| 2006/0044800 A1 | 3/2006 | Reime | |
| 2006/0047132 A1 | 3/2006 | Shenai-Khatkhate et al. | |
| 2006/0049935 A1 | 3/2006 | Giannopoulos et al. | |
| 2006/0139907 A1 | 6/2006 | Yen | |
| 2007/0085863 A1* | 4/2007 | Moriya | G09G 3/3607 345/694 |
| 2007/0119484 A1 | 5/2007 | Kwon et al. | |
| 2007/0145915 A1 | 6/2007 | Roberge et al. | |
| 2007/0182367 A1 | 8/2007 | Partovi | |
| 2008/0006709 A1 | 1/2008 | Ashworth et al. | |
| 2008/0049043 A1 | 2/2008 | Titmuss et al. | |
| 2008/0062192 A1 | 3/2008 | Voliter et al. | |
| 2008/0092800 A1 | 4/2008 | Smith et al. | |
| 2008/0106887 A1 | 5/2008 | Salsbury et al. | |
| 2008/0143273 A1 | 6/2008 | Davidson et al. | |
| 2008/0198175 A1 | 8/2008 | Sun et al. | |
| 2008/0218099 A1 | 9/2008 | Newman | |
| 2008/0265799 A1 | 10/2008 | Sibert | |
| 2009/0052182 A1 | 2/2009 | Matsuba et al. | |
| 2009/0121651 A1 | 5/2009 | Gandhi | |
| 2009/0128059 A1 | 5/2009 | Joosen et al. | |
| 2009/0146982 A1 | 6/2009 | Thielman et al. | |
| 2009/0251127 A1 | 10/2009 | Kim | |
| 2009/0284169 A1 | 11/2009 | Valois | |
| 2009/0295310 A1 | 12/2009 | Duerr et al. | |
| 2010/0068899 A1 | 3/2010 | Shvili | |
| 2010/0070217 A1 | 3/2010 | Shimada et al. | |
| 2010/0118527 A1 | 5/2010 | Choong | |
| 2010/0127638 A1 | 5/2010 | Lan et al. | |
| 2010/0141153 A1 | 6/2010 | Recker et al. | |
| 2010/0172120 A1 | 7/2010 | Wegh et al. | |
| 2010/0194687 A1 | 8/2010 | Corson et al. | |
| 2010/0207534 A1 | 8/2010 | Dowling et al. | |
| 2010/0277067 A1 | 11/2010 | Maxik et al. | |
| 2010/0289664 A1 | 11/2010 | Mizushima et al. | |
| 2010/0296285 A1 | 11/2010 | Chemel et al. | |
| 2010/0301773 A1 | 12/2010 | Chemel et al. | |
| 2010/0327766 A1 | 12/2010 | Recker et al. | |
| 2011/0050120 A1 | 3/2011 | Leung et al. | |
| 2011/0074672 A1 | 3/2011 | Diederiks et al. | |
| 2011/0089838 A1 | 4/2011 | Pickard et al. | |
| 2011/0089842 A1 | 4/2011 | Aldrich et al. | |
| 2011/0095687 A1 | 4/2011 | Jonsson | |
| 2011/0109216 A1 | 5/2011 | Kang et al. | |
| 2011/0109249 A1 | 5/2011 | Liu et al. | |
| 2011/0133655 A1 | 6/2011 | Recker et al. | |
| 2011/0161865 A1 | 6/2011 | Josephsoon et al. | |
| 2011/0163683 A1 | 7/2011 | Steele et al. | |
| 2011/0199004 A1 | 8/2011 | Henig et al. | |
| 2011/0216085 A1 | 9/2011 | Bergman et al. | |
| 2011/0227469 A1 | 9/2011 | Yuan et al. | |
| 2011/0227495 A1 | 9/2011 | Guest et al. | |
| 2011/0234366 A1 | 9/2011 | Feng et al. | |
| 2011/0260648 A1 | 10/2011 | Hamamoto et al. | |
| 2011/0285515 A1 | 11/2011 | Fushimi et al. | |
| 2011/0309769 A1 | 12/2011 | Kuroki et al. | |
| 2012/0025717 A1 | 2/2012 | Klusmann et al. | |
| 2012/0026726 A1 | 2/2012 | Recker et al. | |
| 2012/0080944 A1 | 4/2012 | Recker et al. | |
| 2012/0120243 A1 | 5/2012 | Chien | |
| 2012/0126699 A1 | 5/2012 | Zittel | |
| 2012/0130547 A1 | 5/2012 | Fadell et al. | |
| 2012/0146505 A1 | 6/2012 | Jonsson | |
| 2012/0147604 A1 | 6/2012 | Farmer | |
| 2012/0188172 A1* | 7/2012 | Fong | G06F 3/042 345/173 |
| 2012/0195053 A1 | 8/2012 | Wu | |
| 2012/0206050 A1 | 8/2012 | Spero | |
| 2012/0218421 A1 | 8/2012 | Chien | |
| 2012/0224381 A1 | 9/2012 | Hashimoto et al. | |
| 2012/0281879 A1 | 11/2012 | Vlutters et al. | |
| 2012/0287488 A1 | 11/2012 | Oto | |
| 2012/0299476 A1* | 11/2012 | Roberts | B60Q 1/2607 315/77 |
| 2012/0300441 A1 | 11/2012 | Thomas et al. | |
| 2013/0021795 A1 | 1/2013 | Chien | |
| 2013/0038230 A1 | 2/2013 | Brown et al. | |
| 2013/0063042 A1 | 3/2013 | Bora et al. | |
| 2013/0099672 A1* | 4/2013 | Lin | H05B 47/155 315/129 |
| 2013/0106283 A1 | 5/2013 | Gillio | |
| 2013/0113715 A1 | 5/2013 | Grant et al. | |
| 2013/0121569 A1 | 5/2013 | Yadav | |
| 2013/0148341 A1 | 6/2013 | Williams | |
| 2013/0154985 A1 | 6/2013 | Miyazaki | |
| 2013/0193847 A1 | 8/2013 | Recker et al. | |
| 2013/0249435 A1 | 9/2013 | Hellkamp | |
| 2013/0257312 A1 | 10/2013 | Maxik et al. | |
| 2013/0264943 A1 | 10/2013 | Bora et al. | |
| 2013/0278132 A1 | 10/2013 | Yuan et al. | |
| 2013/0278162 A1 | 10/2013 | Watson et al. | |
| 2013/0278172 A1 | 10/2013 | Maxik et al. | |
| 2013/0292106 A1 | 11/2013 | Lien | |
| 2013/0314680 A1 | 11/2013 | Yamamura | |
| 2013/0326381 A1 | 12/2013 | Pereira et al. | |
| 2014/0021862 A1 | 1/2014 | Chung | |
| 2014/0028199 A1 | 1/2014 | Chemel | |
| 2014/0029749 A1 | 1/2014 | Malasani | |
| 2014/0043825 A1 | 2/2014 | Brandes et al. | |
| 2014/0046152 A1 | 2/2014 | Bechtel et al. | |
| 2014/0049983 A1 | 2/2014 | Nichol et al. | |
| 2014/0084809 A1 | 3/2014 | Catalano | |
| 2014/0097071 A1 | 4/2014 | Park et al. | |
| 2014/0117859 A1 | 5/2014 | Swatsky et al. | |
| 2014/0118385 A1* | 5/2014 | Buckley | G09G 3/2022 345/589 |
| 2014/0152188 A1 | 6/2014 | Bora et al. | |
| 2014/0159600 A1 | 6/2014 | Sutardja et al. | |
| 2014/0184577 A1 | 7/2014 | Kim et al. | |
| 2014/0239811 A1 | 8/2014 | Kreiner et al. | |
| 2014/0265864 A1 | 9/2014 | Hickok et al. | |
| 2014/0265900 A1 | 9/2014 | Sadwick et al. | |
| 2014/0273715 A1 | 9/2014 | Moll et al. | |
| 2014/0273892 A1 | 9/2014 | Nourbakhsh | |
| 2014/0285999 A1 | 9/2014 | Luna et al. | |
| 2014/0300293 A1 | 10/2014 | Ruan et al. | |
| 2014/0300294 A1 | 10/2014 | Zampini et al. | |
| 2014/0321122 A1* | 10/2014 | Domagala | F21V 29/70 362/293 |
| 2014/0354150 A1 | 12/2014 | Joseph et al. | |
| 2015/0015165 A1 | 1/2015 | Engelen et al. | |
| 2015/0038246 A1 | 2/2015 | Zeid | |
| 2015/0048760 A1 | 2/2015 | Kwag et al. | |
| 2015/0062892 A1 | 3/2015 | Krames et al. | |
| 2015/0084513 A1 | 3/2015 | Anthony et al. | |
| 2015/0084515 A1* | 3/2015 | Altamura | H05B 47/115 315/131 |
| 2015/0103515 A1 | 4/2015 | Bosua et al. | |
| 2015/0103520 A1 | 4/2015 | Fournier et al. | |
| 2015/0108904 A1* | 4/2015 | Chen | H05B 45/10 315/153 |
| 2015/0130359 A1 | 5/2015 | Bosua et al. | |
| 2015/0141755 A1 | 5/2015 | Tesar | |
| 2015/0189721 A1 | 7/2015 | Karc et al. | |
| 2015/0208900 A1 | 7/2015 | Vidas et al. | |

(56) References Cited

U.S. PATENT DOCUMENTS

| | | |
|---|---|---|
| 2015/0236225 A1 | 8/2015 | David et al. |
| 2015/0250042 A1 | 9/2015 | Aggarwal et al. |
| 2015/0325157 A1 | 11/2015 | Jumblatt et al. |
| 2015/0325163 A1* | 11/2015 | Kobayashi ............... G09G 3/20 345/690 |
| 2015/0345764 A1 | 12/2015 | Hussey et al. |
| 2015/0359061 A1 | 12/2015 | Adler |
| 2015/0382463 A1 | 12/2015 | Kim et al. |
| 2016/0007431 A1 | 1/2016 | Bosua et al. |
| 2016/0066387 A1* | 3/2016 | Darton .................... G06F 3/016 345/173 |
| 2016/0066393 A1 | 3/2016 | Bosua |
| 2016/0066397 A1 | 3/2016 | Alexander et al. |
| 2016/0073474 A1 | 3/2016 | Van De Sluis et al. |
| 2016/0100086 A1 | 4/2016 | Chien |
| 2016/0264054 A1 | 9/2016 | Uken et al. |
| 2016/0364854 A1 | 12/2016 | Wieser |
| 2017/0118815 A1 | 4/2017 | Altamura et al. |
| 2017/0163439 A1 | 6/2017 | Bosua et al. |
| 2017/0231072 A1 | 8/2017 | Bosua et al. |
| 2017/0309215 A1* | 10/2017 | Perdices-Gonzalez ...................... G09G 3/2003 |
| 2017/0310940 A1* | 10/2017 | Perdices-Gonzalez ...................... G09G 3/2096 |
| 2017/0310956 A1* | 10/2017 | Perdices-Gonzalez ...................... H04N 13/366 |
| 2017/0347422 A1* | 11/2017 | Wang ..................... H05B 45/20 |
| 2018/0005590 A1* | 1/2018 | Komanduri ........... F21V 7/0091 |
| 2018/0022274 A1 | 1/2018 | Kincade et al. |
| 2018/0240418 A1* | 8/2018 | Kobayashi ........... G09G 3/3413 |
| 2019/0254137 A1 | 8/2019 | Sevo et al. |

FOREIGN PATENT DOCUMENTS

| | | |
|---|---|---|
| CN | 102573220 A | 7/2012 |
| CN | 103067492 A | 4/2013 |
| CN | 203099410 U | 7/2013 |

OTHER PUBLICATIONS

Clover Juli, https: Review: Nanoleaf's 'Aurora Smarter Kit' Offers Awesome HomeKit-Enabled Mood Lighting for $200, Jan. 27, 2017, //www.macrumors.com/review/nanoleaf-aurora-smarter-kit/.

Reyes Kimberly, User Story: Grain Lighting, Oct. 21, 2013, https://www.typeamachines.com/additive-manufacturing/user-story-grain-lighting.

"A New Kind of Clean, Vyv Antimicrobial Light works around the clock to create cleaner environments in the places we live, work, and play", viv, https://vyv.tech, downloaded Sep. 24, 2020.

"The Light with the Power to Boost your Defense Against Bacteria", Ellumi Lighting, LED Germ Killing Disinfection Lighting, https://www.ellumilighting.com, downloaded Sep. 25, 2020.

* cited by examiner

Virtual representation

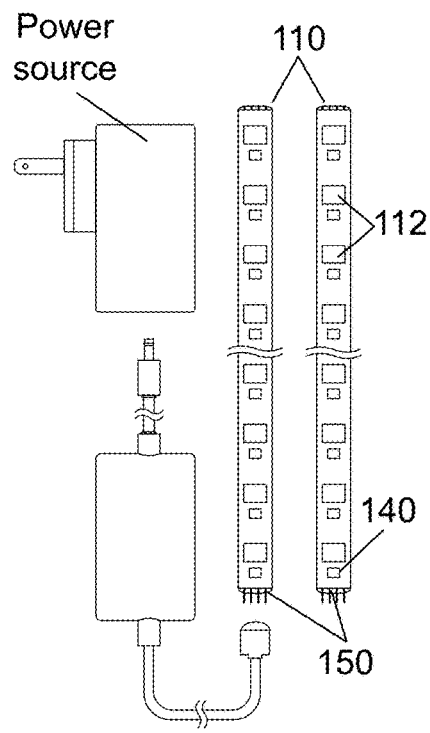
FIGURE 10A
FIGURE 10B
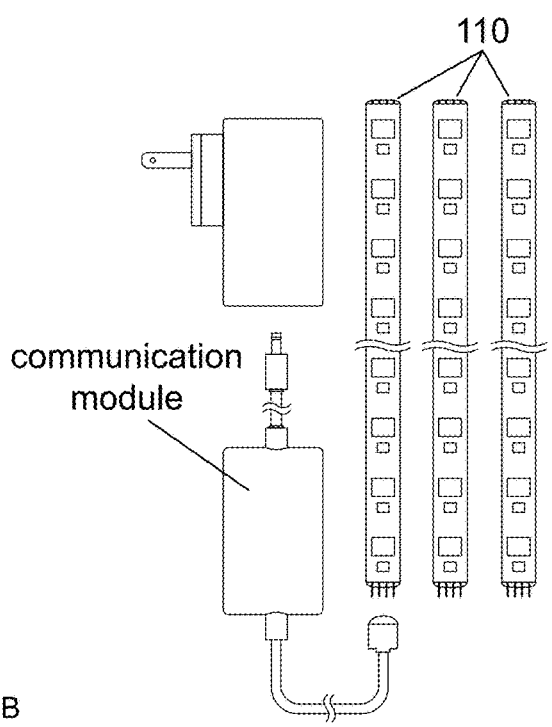
FIGURE 10C
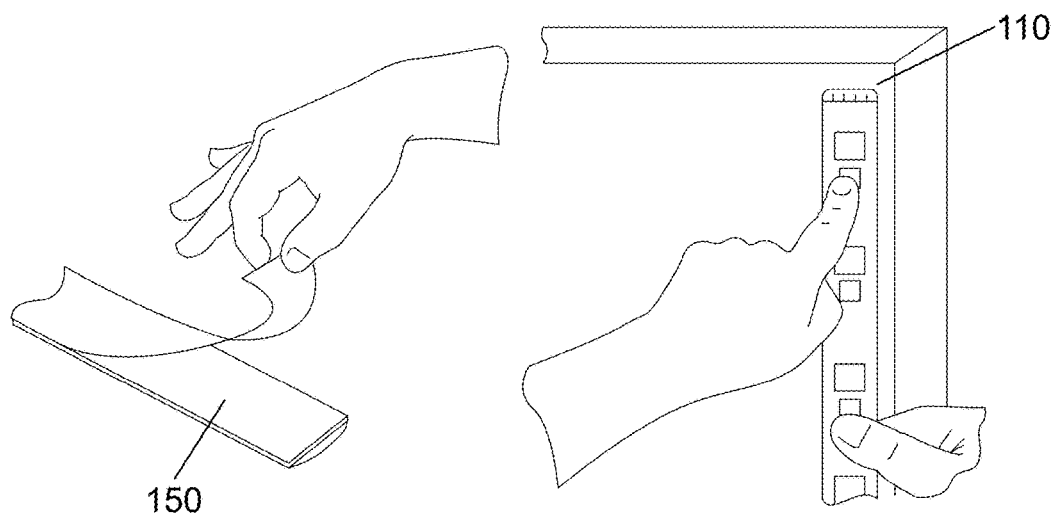
FIGURE 11

LIGHTING SYSTEM AND METHOD

CROSS-REFERENCE TO RELATED APPLICATIONS

This application is a continuation of U.S. patent application Ser. No. 16/548,319, filed 22 Aug. 2019, which is a continuation of U.S. patent application Ser. No. 15/801,600 filed 2 Nov. 2017, which claims the benefit of U.S. Provisional Application No. 62/455,391 filed 6 Feb. 2017, U.S. Provisional Application No. 62/416,330 filed 2 Nov. 2016, and U.S. Provisional Application No. 62/416,980 filed 3 Nov. 2016, each of which is incorporated in its entirety by this reference.

TECHNICAL FIELD

This invention relates generally to the connected lighting field, and more specifically to new and useful systems and methods for controllable dynamic lighting in the connected lighting field.

BRIEF DESCRIPTION OF THE FIGURES

FIGS. 10A-10C are examples of an embodiment of the lighting system in various modular configurations.

FIG. 11 is an illustration of a spatial configuration of an embodiment of the lighting system.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System

The controllable dynamic lighting system, herein referred to as the lighting system 100, includes a lighting element device and a controlling means, the combination of these features allowing for the control of light output by the lighting system 100. The lighting system 100 functions to output light in a controllable manner, preferably based on user input but alternatively based on any other suitable input. In particular, the lighting system 100 can change the spatial distribution of the output light (e.g., increase the relative light parameter values of one lighting system unit relative to another, decrease the relative light parameter values of one portion of a light emitting unit relative to another, etc.). The lighting system 100 can optionally change the intensity, color, hue, saturation, intensity, on/off state, or other parameter of the output light.

Figure 1:
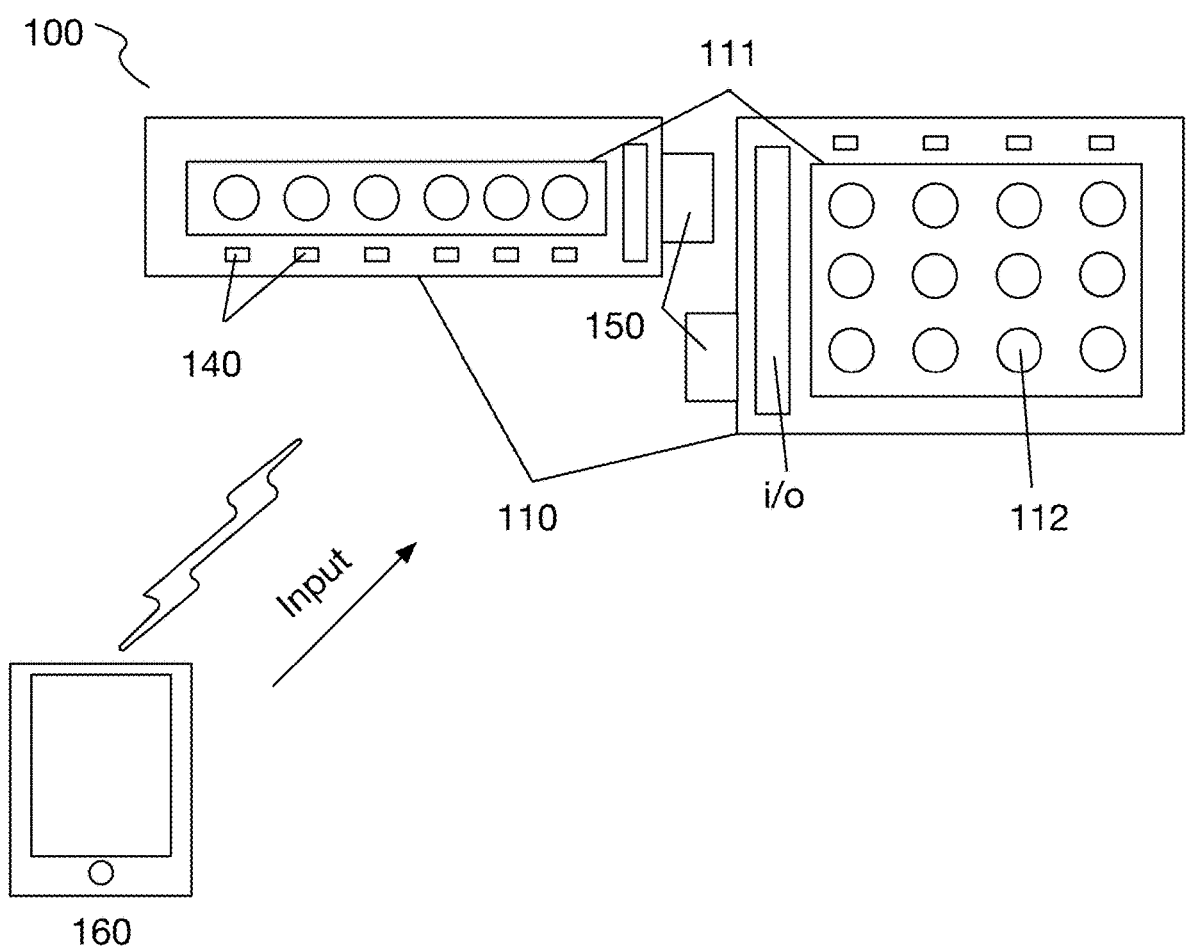
FIG. 1 is a schematic representation of an embodiment of the lighting system.

In one example shown in FIG. 1, the lighting system unit 110 of the controllable dynamic lighting system 100 includes a light emitting unit 111, a housing 130, a touch-sensitive surface 132, a connector 150, a control module 140, and an input. Additionally or alternatively, the lighting system unit can include an output. The lighting system unit functions to emit light (e.g., the output light) by way of the light emitting unit 111. Additionally, the lighting system unit 110 can function to provide an interface (e.g., a connector) for modular expansion of the overall lighting system through the addition of further lighting system units.

Figure 2:
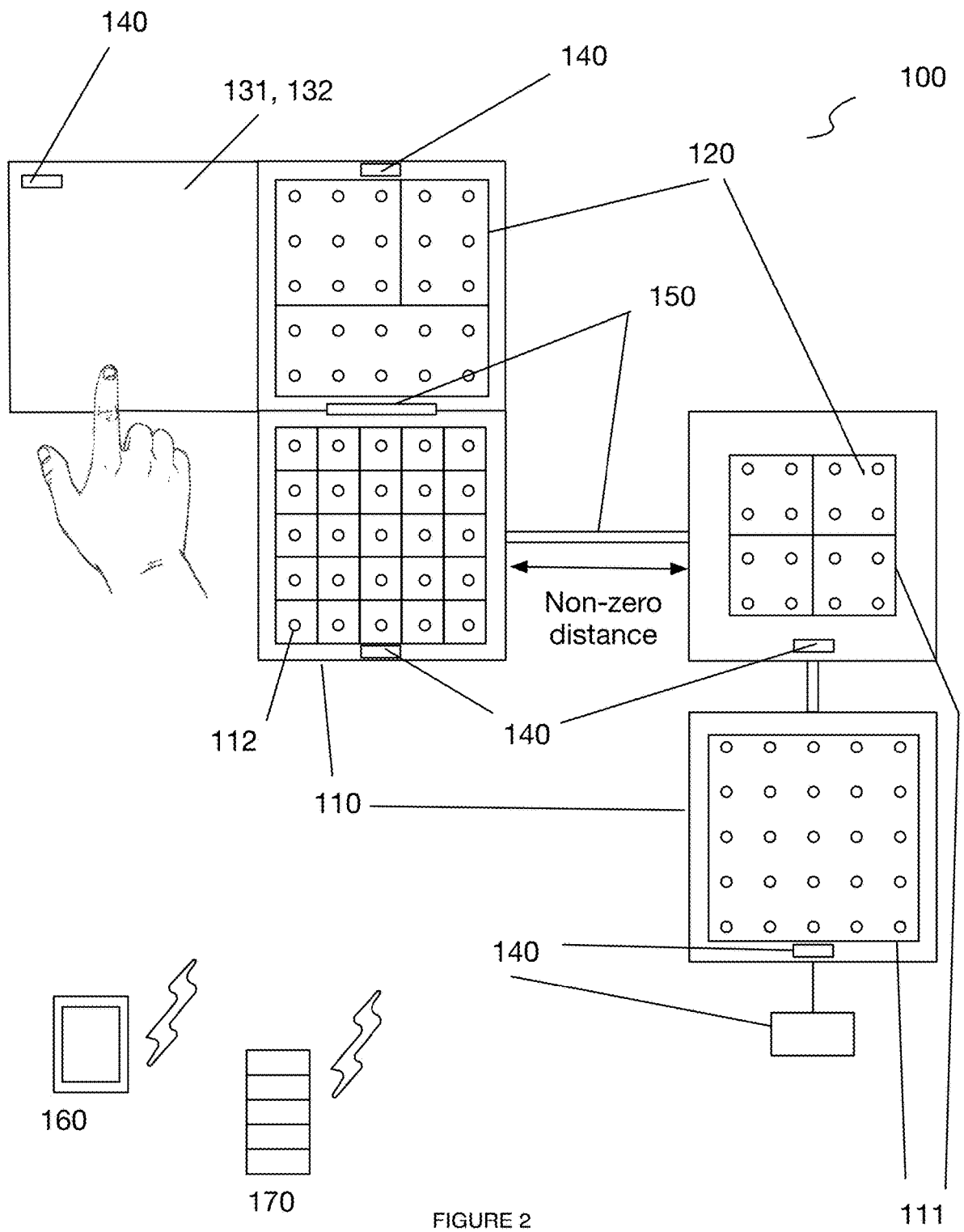
FIG. 2 is an example embodiment of the lighting system.

In one variation, the lighting element device is a lighting system unit 110 (e.g. as shown in FIG. 2). Alternatively, the lighting element device can include any number of elements configured to emit light, in any arrangement. The lighting system can be formed from one or more lighting system units no. Preferably, the controllable dynamic lighting system can be expanded by physically and/or communicatively coupling additional lighting system units no to the lighting system unit no (e.g. as shown in FIGS. 10A-10C and FIG. 12); in these variations, the term "lighting system" further includes the terms "modular lighting system" and "modular lighting assembly", wherein a modular lighting system or modular lighting assembly preferably includes at least two lighting system units no. In an alternative variation, the lighting system can include a stand-alone lighting system unit no that is not expandable. Preferably, each lighting system unit 110 in a lighting system includes a controlling means; alternatively, there may be a single controlling means for a lighting system, or any number or arrangement of controlling means.

Preferably, each lighting system unit includes at least one light emitting unit 111, which functions to emit light and illuminate the surroundings of the lighting system unit per desired specifications and/or user input. The light emitting unit 111 preferably includes one or more light emitters 112 (e.g., solid state light emitters/LEDs, incandescent bulbs, LCD/LED screens, etc.). In one embodiment, the light emitters 112 are arranged with a consistent spacing from each other (e.g., between adjacent light emitters) within the light emitting unit 111. This spacing is preferably non-negligible and is discernible by the naked human eye. Alternatively, any uniform or non-uniform arrangement may be used. Each light emitter 112 is preferably an LED, such as a red-green-blue (RGB) LED. Alternatively, a light emitter 112 can be a light source other than an LED (e.g. fluorescent bulb, laser, etc.). In some variations, each light emitter 112 includes a set of multiple light emitters 112 (e.g. a set of three single-color LEDs). In some variations, a light emitting unit 111 or a lighting system includes multiple types of light emitters 112 (e.g. miniature LEDs, high-power LEDs, bi-color LEDs, fluorescent bulbs, etc.). Preferably, each light emitter 112 can emit light of any wavelength in the visible spectrum (i.e. 390 nm and 700 nm). Additionally or alternatively, each light emitter 112 can emit a subset of wavelengths in the visible spectrum or radiation outside the visible spectrum (e.g. invisible light, such as infrared radiation or UV light).

The lighting system preferably defines one or more controllable zones 120 (controllable regions), wherein each controllable zone 120 is individually indexed and/or individually controllable by a controlling means. Each lighting system unit preferably includes one or more controllable zones 120, but can include any suitable number. Each controllable zone 120 preferably includes a set of one or more light emitting units, wherein each light emitting unit can include one or more light emitters, but can alternatively include one or more lighting system units, the entire lighting system, or any other suitable component. Preferably, at any given time, each light emitter in a controllable zone 120 emits light with the same characteristics (e.g. color, intensity, saturation, etc.) as every other light emitter in the controllable zone 120 (e.g., the light emitters within a single controllable zone 120 are indexed and/or controlled as a single endpoint). When the controllable zone 120 includes multiple light emitters, the light emitters are preferably adjacent, but can alternatively be separated (e.g., by intervening light emitters not in the controllable zone). The light emitters within a controllable zone 120 are preferably from the same light emitting unit, but can be from different light emitting units, different lighting system units, auxiliary devices, or from any other suitable system. The controllable zones 120 of the system are preferably separate and distinct (e.g., include separate and distinct light emitter sets), but can alternatively overlap (e.g., multiple controllable zones can include a common light emitter). The light emitter assignment to a controllable zone 120 is preferably predetermined and fixed, but can be dynamically determined. For example, the controller(s) can be configured to support a fixed number of controllable zones 120 per square meter of an array of light emitters, substantially independently of the number of light emitters making up the array. In another example, the controllable dynamic lighting system can support a fixed number of controllable zones 120 (e.g., 5, 50, 100, etc.), and as additional lighting system units are added to the overall lighting system, the correspondence between the controllable zones 120 and the individual light emitters can dynamically adjust to maintain a similar number of light emitters in each controllable zone of each light emitting unit. Alternatively, there can be any suitable configuration of controllable zones 120 of the light emitting unit or units. The lighting system unit preferably includes no more than 200 controllable zones or light emitting units per square foot of the lighting system unit, but can alternatively include 1,000 controllable zones or light emitting units per square foot, 100 controllable zones or light emitting units per square foot, 10 controllable zones per square foot, or any suitable number or density of controllable zones and/or light emitting units.

The controlling means of the lighting system functions to control the light properties of the lighting system. The controlling means preferably includes one or more control modules 140, wherein a control module 140 functions to control the output of the light emitters in one or more controllable zones. The control module 140 (e.g., controller) can include one or more microchips or microprocessors, a CPU, a GPU, a TPU, ASICs or any other suitable control hardware.

The control module(s) 140 of the lighting system can be arranged in any suitable configuration, and be associated with (e.g., be connected to and/or hosted by) any suitable set or subset of lighting systems, lighting element devices, lighting system units, light emitting units, and/or light emitters. However, the control module(s) 140 can be otherwise arranged and/or configured. In some variations, the control module 140 can include a plurality of submodules associated with each component for which control is desired (e.g., one control submodule 140 per controllable component, one control submodule 140 per two controllable components, etc.), but can alternatively include a single module. For example, a plurality of submodules 140 of the control module 140 can include a set of microprocessors, each microprocessor associated with and configured to control an individual light emitter of a light emitting unit. Alternatively, the control module 140 can include a single microcontroller that is communicatively coupled with each system component (e.g. a controllable zone) for which control is desired. Alternatively, the lighting system can include one control submodule 140 per lighting system unit in a lighting system with one or more lighting system units.

In one variation, the control module 140 includes one or more control submodules 140 and a master control module 140, wherein the master control module 140 functions to control the control submodules 140 (e.g. as shown in FIG. 2). Preferably any lighting system unit in the lighting system can be associated with the master control module, but alternatively a specific lighting system unit (e.g. master lighting system unit) can be predetermined to be associated with the master control module. In one example, a control submodule 140 (e.g. a microprocessor) is associated with each lighting system unit and a single master control module 140 (e.g. system on a chip, microprocessor, etc.) is associated with each control submodule 140. In a specific example, the lighting element device includes a plurality of lighting system units and a master controller. Each lighting system unit includes a local controller (control module 140) that individually controls the controllable zones on the respective lighting system unit. Each controllable zone can additionally or alternatively include a zone controller that controls the light emitting units within the respective controllable zone. The master controller (e.g., lighting element device controller, lighting system controller, lighting system unit controller) is preferably electrically connected to each lighting system unit (e.g., in parallel, serially, etc.) within the lighting element device, more preferably to the respective local controllers but alternatively to another lighting system unit component. The master controller can optionally be connected to a power source (e.g., battery, power outlet, etc.) by a wired connection. In this variation, the master controller can receive control instructions from a control endpoint (e.g., another component of the controlling means, a client executing on a user device, a remote computing system, etc.) and pass all or a portion of the control instructions to the local controllers for execution. However, the master and/or local controllers can operate in any suitable manner.

In a second variation, the controlling means is distributed. In this variation, each lighting system unit includes a local controller (e.g., for the entire lighting system unit, for a controllable zone, etc.), wherein the control instruction can be broadcast to the local controllers within the lighting element device, and the local controllers can individually determine which control instructions to execute. In one example, the local controllers can vote on which control instructions to execute. In a second example, one local controller can be nominated or otherwise assigned to be a master controller, and assign control instructions to other local controllers for execution. In a third example, the control instructions are pre-assigned to different local controllers, wherein each local controller executes the respective assigned control instruction. However, the controlling means can be otherwise distributed.

The controlling means can optionally include the control module 140 (e.g. processor) of an auxiliary device, wherein the control module 140 of the auxiliary device performs some part or all of a process used in controlling the light properties of the lighting system. The auxiliary device can be: a user device (e.g., mobile device, such as a smartphone, wearable, tablet, laptop, etc.), a system connected to a common network (e.g., a smartcamera, smart lock, etc.), or be any other suitable device. In one example, the control module 140 of a user device is an application (e.g., client, native application, browser application, operating system application, etc.).

The control module 140 can optionally include on-board volatile and/or non-volatile memory, such as RAM or Flash memory. The memory preferably functions to: store configuration settings (e.g., for WiFi or device connection), layout information (e.g., controllable zones indices, adjacent lighting system units, relative orientations of lighting system units, etc.), calibration maps, control instructions, system identifiers (e.g., for the individual lighting system unit, lighting system unit type or other information, etc.), or any other suitable operation information. In one variation, each control module 140 in a lighting system further includes memory (e.g. RAM), which functions to store information involved in the processes performed by the control module. Alternatively, only a single control module 140 or a subset of control modules 140 may further include memory. Alternatively, none of the control modules 140 may include memory. In one example, all data used by and produced by the control module(s) 140 of the lighting system are stored in a remote server 170.

However, the control module 140 can include any other suitable set of components.

The control module 140 of a lighting system preferably functions to perform a set of processes involved in controlling the light properties of the lighting system. Preferably, the set of processes includes receiving one or both of: a region selection and a color selection. In one variation, the region selection and the color selection are chosen by a user. Alternatively, one selection may be chosen by a user and another selection may be determined without user input. For instance, the region selection may be chosen by a user and the color selection may be determined by an algorithm. The region and color selections may be received from any number and type of sources. In one variation, the region and color selections are both received from the same source (e.g. an application on a user device). In another variation, the region and color selections are received from separate and distinct sources. For example, the region selection can be received from an application on a user device, while the color selection is received from a control module associated with a touch-sensitive surface, separate and distinct from any touch-sensitive surfaces attached to the user device. In a second example, the region selection is received on a touch-sensitive surface of the lighting element device (e.g., of one or more lighting system units), while the color selection is received from the user device. In a third example, both the region selection and color selection are received on the touch-sensitive surface of the lighting element device.

The region selection preferably includes (e.g., is associated with, maps to, etc.) one or more controllable zones of one or more lighting system units, but can be associated with any suitable set of controllable zones. The selected controllable zones can be contiguous (e.g., adjacent, abutting), separated, or otherwise spatially related. The color selection preferably includes the hue of the light to be emitted by a light emitter in the lighting system, but can additionally or alternatively include a light property other than hue, such as tint, shade, tone, lightness, chromacity, luminescence, saturation, intensity, on/off state, or any other suitable property. In some variations, the color selection includes multiple light properties. The color option can be selected by the methods described for selecting a color in U.S. patent application Ser. No. 14/782,866 filed 7 Oct. 2015, which is incorporated in its entirety by this reference. Alternatively, the color and region selections can be made verbally (e.g., orally, etc.) or in any suitable way with any suitable device.

The set of processes performed by the controlling means preferably further includes determining a layout of the lighting system or the modular lighting system (e.g., as discussed below). Alternatively, any other method can be used for determining the layout of the lighting system.

The set of processes performed by the controlling means preferably further includes determining an indexing scheme, which can be subsequently used to identify the indices of the controllable zones corresponding to the region selection. Additionally or alternatively, indices corresponding to other elements of the lighting system, including the lighting system itself, may be identified.

Preferably, each controllable zone in a lighting system is individually indexed, according to one or more indexing schemes. In some variations, the indexing scheme is determined by and stored on a single control module; alternatively, any number and combination of control modules may be involved in the indexing scheme(s). The indices of the light emitters in a controllable zone are preferably stored in the control module of that controllable zone's associated lighting system unit. Alternatively, the indices of the light emitters in a controllable zone may be stored in a master control module of the modular lighting system, a user device, an application on a user device, a remote computing system (e.g. cloud-based computing system), or any other storage type or location.

In a first variation, a double-indexing scheme is used, wherein two indices—a primary index and a secondary index—are determined and stored, wherein the primary and secondary indices are preferably stored in separate control modules. The primary index serves to uniquely identify each controllable zone within a single lighting system unit. The primary indices for each control module in the lighting system unit are preferably stored in a control submodule (e.g. the control module of a lighting system unit) but can be stored in a library (e.g., retrieved from a remote computing system) or otherwise stored. The secondary index serves to uniquely identify each lighting system unit within a modular lighting system (e.g., lighting element device). The secondary indices for each lighting system unit in the modular lighting system are preferably stored in a master control module of the modular lighting system, but can be stored by a remote computing system, a control submodule, or by any suitable system. In the secondary indexing scheme, each lighting system unit is treated as a singular controllable zone. In this variation, lighting instructions (e.g. color assignments) are assigned to each indexed lighting system unit, based on the secondary indexing scheme, wherein each lighting system unit individually determines control instructions for each controllable zone within the lighting system unit, based on the primary indexing scheme.

In a second variation, each controllable zone throughout a modular lighting system is individually indexed and uniquely identifiable in a single indexing scheme, and preferably stored in a single master control module of the lighting system, wherein the control module generates lighting instructions (e.g. timing and duration of light emitters being in an 'on state') for each controllable zone. In some variations, the indexing scheme is updated multiple times during the life cycle of the system, and can be updated based on various different cues. Such cues, for instance, may include detecting the addition of a lighting system unit to the modular lighting system, receiving power in the modular lighting system (e.g. plugging in the modular system to a wall outlet), receiving user instruction, determining the modular lighting system layout (e.g. the number of modular lighting system units, the configuration of the modular lighting system units, the relative position or orientation of the modular lighting system units, etc.), or any other cue or combination of cues. In a first example of the second variation, each controllable zone is assigned a specific index number, wherein the index number uniquely identifies each controllable zone in a modular lighting system. The indexing scheme further includes determining the lighting system unit to which each controllable zone belongs; determining this can involve a variety of different methods and processes. In one example, a counting method is performed, wherein the number of lighting system units in a modular lighting system are counted. In some variations, the counting method is performed as discussed in the method below. Alternatively, any other method of counting can be used. Additionally or alternatively, the method may include receiving information from a control module associated with a lighting system unit, such as, but not limited to: a lighting system unit identification (ID), spatial coordinates, a graphical representation of the modular lighting system layout, etc. In some variations, a data bus is used to receive and transmit information. In some variations, layout information is retrieved from a database. Additionally or alternatively, layout information can be determined from the type of connection between units, such as a known length of a cable connecting two lighting system units. Alternatively, energy measurements (e.g. power, voltage, current, resistance, etc.) can be used in determining layout information of the modular lighting system. Example implementations of this method are described below. Alternatively, any other method may be used.

In a third variation, a combination index for each controllable zone is stored in a master control module, wherein the combination index identifies the lighting system unit which contains that controllable zone, as well as an identifier for that controllable zone within the lighting system unit. Alternatively, the combination indices may be stored in any suitable control module or combination of control modules. In this variation, the layout and number of controllable zones within a lighting system unit is preferably predetermined, fixed, and stored in a master control module. Further, the layout and number of lighting system units within a modular lighting system is preferably predetermined, fixed, and stored in a master control module. Alternatively, layout and number information may be dynamic and stored in any suitable format and location.

Alternatively, any other indexing scheme, combination of indexing schemes, or method for determining an indexing scheme can occur.

Each controllable zone (e.g., the light emitters within a controllable zone) functions to emit light having a set of properties (e.g., hue, saturation, intensity etc.), wherein the properties are preferably specified by the user inputs, but can alternatively be predetermined, dynamically determined (e.g., by a user, by a user device client, etc.), or otherwise determined. The light properties can be received from the control module, a master control module, or otherwise obtained. In one variation, the light properties are determined in accordance with learned behaviors of a user, such as times of occupancy in a household. The user behaviors, preferences, operation contexts, or other information can be determined using deterministic, probabilistic, symbolistic, Baysean, or other processes; neural networks; genetic programs; support vectors; lookup tables; equations; or any other suitable method. In alternative variations, the light properties have temporal characteristics, wherein the light properties are determined based on the time of day, the particular day during the week, a holiday, or based on any other suitable unique or recurrent timeframe or event. Additionally, a control module of the lighting system can determine light properties based on environmental conditions. In one variation, the lighting system is WiFi-enabled, and can use Internet data (e.g. weather conditions, daily sunset times, social media information, etc.) to determine light properties. In one example, the light emitters are programmed to operate at maximum intensity during times when the weather forecast is overcast. However, any other suitable auxiliary or contextual information from any other suitable source can be used. Each light emitter within a light emitting unit is preferably controlled as a set alongside other light emitters within the same light emitting unit. However, individual light emitters can alternatively be indexed and controlled independently. In a first specific example, each light emitter is an independently controllable red-green-blue (RGB) LED.

Figure 8:
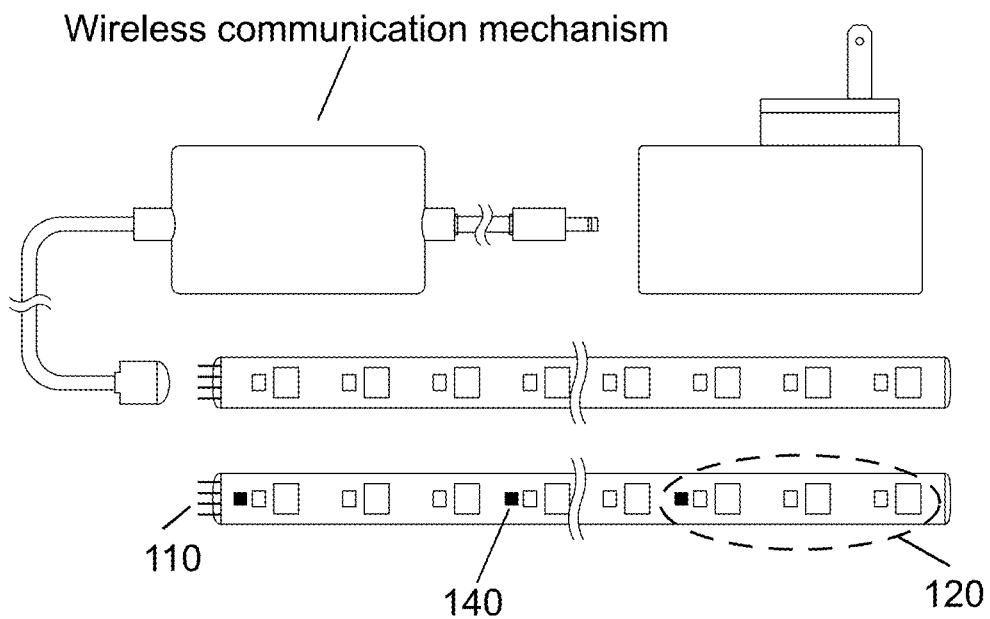
FIG. 8 is an example embodiment of the lighting system.

The lighting system unit can have various configurations. Example configurations include: a matrix or array having any suitable geometry (e.g., rectangle, square, triangle, hexagon, etc.), a predetermined open or closed curve (e.g., a circle, a sinusoid), a line, a flexible strip, or any other suitable configuration. In a first variation, the lighting system unit is configured as a rigid bar. In a second variation, the lighting system unit is configured as a flexible strip and/or tape (e.g. as shown in FIG. 8). In a third variation, the lighting system unit is configured as a rectangular (e.g. square) panel. In a fourth variation, the lighting system unit is configured as an elongated rectangular panel, resembling a beam. In a fifth variation, the lighting system unit is configured as a sphere. In a sixth variation, the lighting system unit is configured as a lightbulb (e.g., a candelabra lightbulb, wherein a strip of individually indexed and controllable light emitters extends along the candelabra longitudinal axis). The lighting system unit can also be a directional lighting system like that described in U.S. patent application Ser. No. 14/920,020, entitled "Directional Lighting System and Method," filed 22 Oct. 2015, which is incorporated in its entirety by this reference. However, the lighting system unit can have any suitable configuration.

Figure 3:
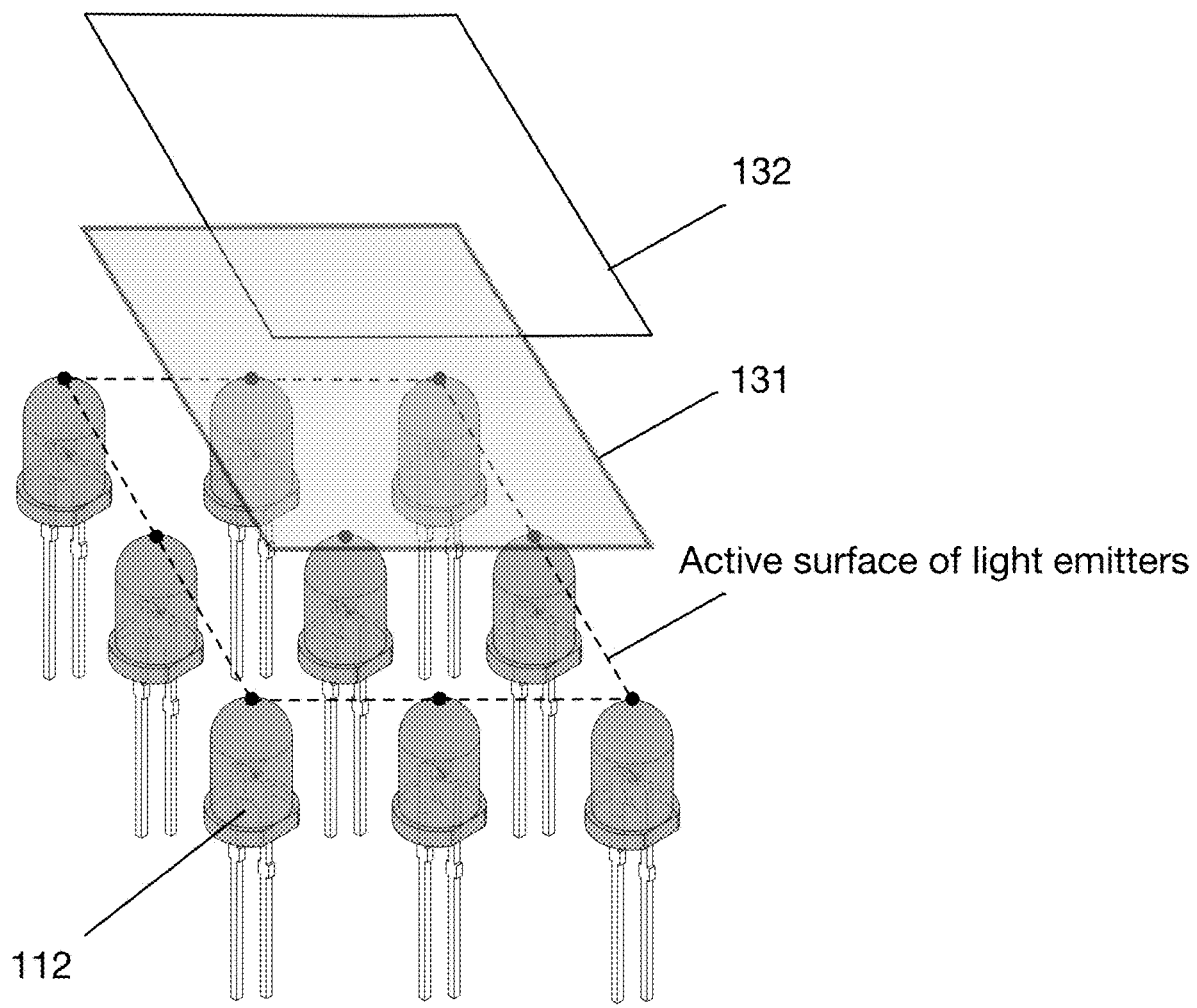
FIG. 3 is an example arrangement of the lighting system housing.

The lighting system unit optionally includes a housing 130, wherein the housing 130 functions to diffuse the output of the light emitters. Additionally or alternatively, the housing 130 may function to provide structure to the lighting system. In one variation (e.g. as shown in FIG. 3), the housing 130 has a first face 131, wherein the first face 131 is parallel to and proximal the active surface of the light emitters. The active surface of the light emitters herein refers to a surface defined by the portion of the light emitters from which the highest intensity light or highest proportion of light is emitted (normal to the direction in which the highest intensity light is emitted). For instance, in the case of a planar array of LEDs, wherein the LEDs each include a dome-shaped housing 130, the active surface can be a plane contiguous with and/or parallel to the apex of the LED housing domes. In another example, the light emitters are LEDs in a cylindrical arrangement; the active surface would be a cylindrical shell contiguous with the apexes of the LED domes. Preferably the first face 131 has the same shape as the arrangement of the light emitters. In one variation, the light emitters are arranged in a planar configuration, and the first face 131 is a rectangular sheet. The outline of the first face preferably includes all ninety-degree angles, thereby facilitating full-edge contact between lighting system units in the modular system. In one example, the full-edge contact functions to overlap light projections ('leak light') between adjacent lighting system units, effectively giving an organic and soft transition (e.g. blending) between lighting system units. In one variation, the light emitters are arranged in a cylindrical configuration, and the first face 131 is a cylindrical shell. In some variations, the first face 131 encloses the whole system or multiple light emitting units—in other variations, the housing simply covers a set of light emitters. The distance between the first face 131 and the active surface is preferably determined based on the material properties of the diffusive material, such as the diffusion angle. The diffuser is preferably planar, but can alternatively be curved or have any other suitable geometry. The diffuser is preferably made from a solid sheet of plastic, but can alternatively be made from cloth, woven plastic, or any other suitable material. Examples of diffuser material include Makrolon™ Lumen LC5, Acrylite (0D0002), Fusion Optix™ (e.g., 4040 or 6060), or any other suitable material. The diffuser is preferably between 10%-90% transparent (e.g., allows 10%-90% of incident light through), but can alternatively be between 30%-70% transparent, or have any other suitable transparency. The diffuser preferably permits 100% light transmission, but can alternatively permit 10%-90% light transmission, between 25-75% light transmission, or permit any other suitable light transmission therethrough. In one example, the first face has an optical transmittance of 90% or less. The diffuser preferably scatters 10-90% of the incident light, but can alternatively scatter 20-80% of the incident light, 30-70% of incident light, or scatter any other suitable proportion of incident light. The diffuser is preferably white and reflects light across the visible light spectrum, but can alternatively be tinted and reflect light along a subset of the visible light spectrum, or have any other suitable color. In one variation, each lighting system unit has a single housing 130; alternatively, each lighting system unit may have multiple housings 130, or a single housing 130 may cover multiple lighting system units, a portion of a lighting system unit, or any number and arrangement of light emitters. Optionally, the housing 130 may further include a second face opposite the first face and distal the active surface of the light emitters. In one variation, the second face is offset from the first face, leaving a gap between the first and second face of preferably 10-50 mm (e.g., such that the housing has a total thickness of 35 mm). Alternatively, any other spacing between the first and second face may occur. Further alternatively, the spacing may be non-uniform. Further alternatively, the spacing may be variable. Preferably, the second face has the same material properties as the first face; alternatively, the second face can be made of any suitable material. In some variations, the housing 130 further includes any number of side or edge pieces, which function to connect the first face to the second face. In some variations, the housing 130 further functions to provide a structure to the lighting system (e.g. physically supporting the light emitters and maintaining a constant spacing between them). The housing 130 may further include additional faces (e.g. a bottom face to which a control module is adhered), diffusive surfaces (e.g. a diffusive filter), materials, components, fastening mechanisms, or any other elements. In some variations, the housing 130 encloses one or more control modules. Alternatively, a control module may be attached to a side of the housing 130.

Figure 19A:
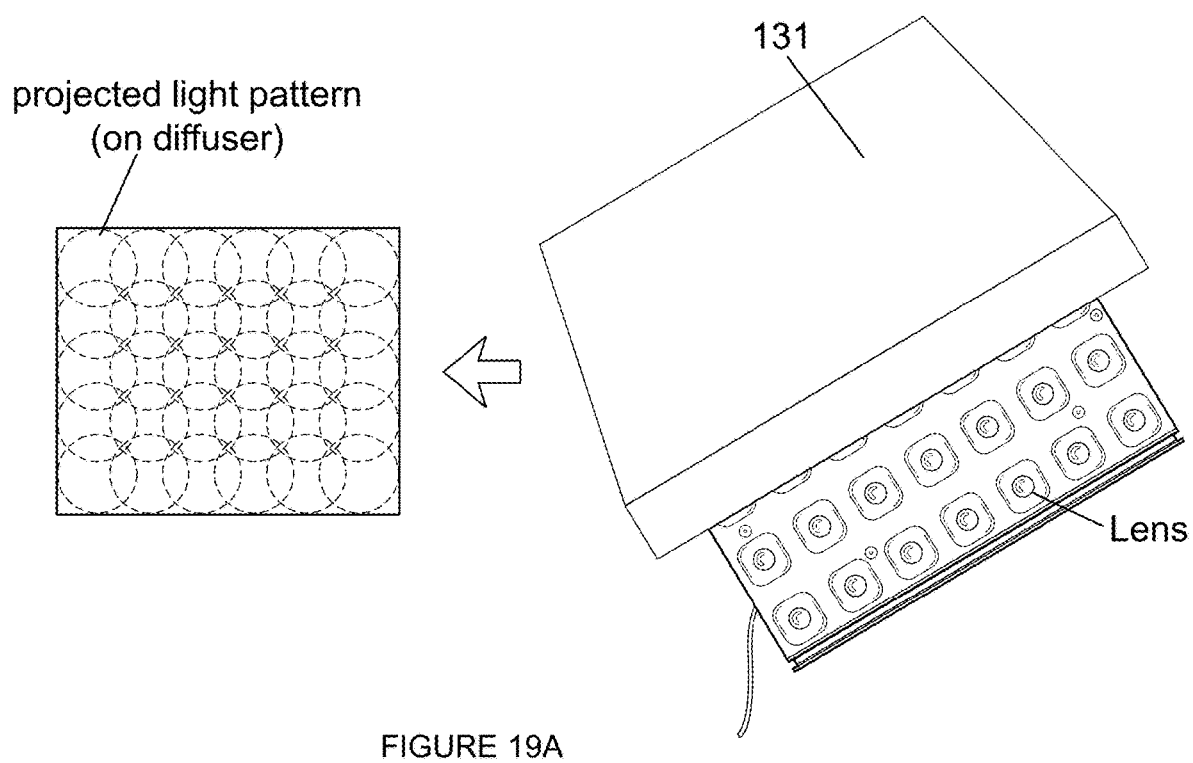
FIGS. 19A-19B are examples of a lens.
Figure 19B:
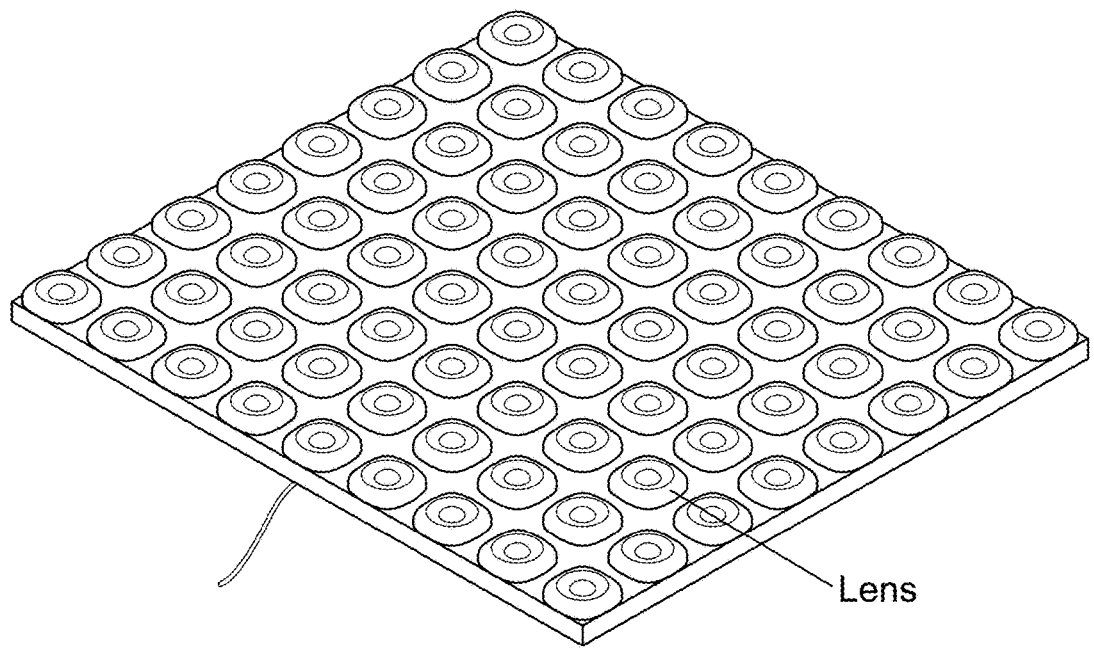

Additionally, the lighting system unit can include one or more lenses, which functions to control the projection of light from one or more light emitters. Preferably, the lens is arranged distal to the first face, but can be otherwise arranged. The lighting system unit can include one lens per light emitter, light emitting unit, lighting system unit, or any other suitable system or sub-system; however, the lighting system can include any suitable number of lenses for any suitable set of components. The lens is preferably convex (e.g., toward the diffuser), but can alternatively be concave, toroidal, or have any suitable geometry. In one variation, as shown in FIGS. 19A and 19B, the lighting system unit includes an array of lenses, which function to cause overlap (e.g. blending) between light projections of adjacent controllable zones (e.g., shown in FIG. 19A). In one example, a protrusion is arranged over each light emitter.

Additionally, the lighting system unit can include a substrate, which is arranged distal to the front face and functions to physically support any or all of the light emitting unit, the connector(s), the control module(s), the input, and/or any additional component of the lighting system unit. Preferably, the light emitters are adhered (e.g. through soldering) to the substrate; alternatively, they can be fastened in any other way, not fastened, or not even in contact the substrate. Preferably, housing's second face serves as the substrate. The substrate can define the form factor of the lighting system unit (e.g., have the same profile as the lighting system unit), or have a different profile from the lighting system unit (e.g., preferably with a smaller footprint, but alternatively with a larger footprint). In one variation, each lighting system unit has a single substrate; alternatively, each lighting system unit may have multiple housings, or a single housing may cover multiple lighting system units, a portion of a lighting system unit, or any number and arrangement of light emitters.

The lighting system may further include a connector 150, wherein the connector 150 functions to communicatively connect (e.g. transfer data), mechanically connect, and/or electrically connect (e.g., transfer power) the lighting system unit to additional lighting system units, power sources, controllers/control modules, wireless communication mechanism(s), remote computing system(s), mobile devices, and/or any other suitable components. The connector 150 is preferably located along a coupling interface of the lighting system unit (e.g. as shown in FIG. 2), but can alternatively be located at any suitable portion of the lighting system unit. The coupling interface can be arranged along an edge of the housing (e.g., along a first and second opposing side, along all sides, etc.), the first face, the second face, along or proximal an edge or corner of the lighting system unit, or along any suitable portion of the lighting system unit. In one example, the lighting system unit includes two connectors 150, one at each opposing side of the lighting system unit, to enable bidirectional and modular connection to additional lighting system units. Alternatively, the lighting system unit may include one or more connectors 150 at every side to enable complete two-dimensional, or even three-dimensional, modularity. For example, each rectangular lighting system unit can include at least one connector 150 on every side, which enables the lighting system unit to connect to at least four other lighting system units, one per side. In one variation, the connectors 150 are located at the centers of the sides of the lighting system unit, to enable a flush mating of connected modular pieces. However, the lighting system unit can include any suitable number of connectors 150, arranged along any suitable surface (e.g., side, broad face, edge, corner, etc.). The connector 150 can be a mechanical connector 150 (e.g., mechanically connect lighting system units and/or other portions of the system), such as a set of magnets, clips, adhesive(s), or any other suitable mechanical connector 150. The connector 150 can be sexed (e.g., male, female), sexless, part of a complimentary pair (e.g., one of a magnetic connector pair that cooperatively generates an attractive force), or otherwise configured. The connector 150 can additionally or alternatively be a data connector (e.g., communicably connect lighting system units and/or other portions of the system), which can include exposed flush-mounted metallic contacts, male/female data cabling, wireless connectivity (e.g., Wi-Fi, Bluetooth, cellular, other short- and/or long-range communication systems, etc.), or any other suitable communication system. In one variation, the lighting system unit has multiple types of connectors 150. In one example, a first type of connector 150 (e.g. a magnet) is used to connect lighting system units together, and a second type of connector 150 (e.g. an adhesive) is used to connect a lighting system unit to another surface (e.g. a wall) (e.g. as shown in FIG. 1i). In another variation, a mechanical connector 150 (e.g. a rod) is used to connect lighting system units together, and an electrical connector 150 (e.g. a cable) is used to connect a lighting system unit or a lighting system to a power supply. In some variations, the connector 150 is female connector 150 (e.g. a port), a male connector 150 (e.g. a plug), or a combination of both male and female connectors 150 (e.g. USB port and USB plug). In these variants, each lighting system unit is preferably substantially identical (e.g., within manufacturing tolerances), wherein a first side includes the first connector of a complimentary pair (e.g., male connector) and the opposing side includes the second connector of the complimentary pair (e.g., female connector). However, the lighting system units can be otherwise configured. Preferably, the connector allows for variable, non-zero spacing between lighting system units. In one example, the connector 150 includes USB-C ports disposed along the edges of a lighting system unit along with a double-ended USB-C cable, which fits into the USB-C ports, and serves to connect two lighting system units together with a spacing determined by the length of the cable. In some variations, the connector 150 (e.g. cable) has a variable length.

The lighting system can optionally include an input element, which functions to receive data and/or instructions pertaining to the operation of the controllable dynamic lighting system. In one variation, the lighting system further includes a touch-sensitive surface 132, which functions to receive tactile input, preferably from a user. Preferably, each lighting system unit in a lighting system has its own touch-sensitive surface 132; alternatively, each lighting system unit may have multiple touch-sensitive surfaces 132, or a single touch-sensitive surface 132 may cover multiple lighting system units, a single lighting system unit of a multi-unit system, a portion of a lighting system unit, or any number and arrangement of light emitters. Preferably, the touch-sensitive surface 132 of a light-emitting unit overlays the entire projection of the light emitters onto the first face. Alternatively, the touch-sensitive surface 132 may overlay some portion (e.g., less than 100%, less than 50%, less than 10%, etc.), or none of that projection. In one variation, the touch-sensitive surface 132 is mounted on the housing, preferably on the first face but alternatively on a housing side or along any other suitable portion of the housing or unit. The touch-sensitive surface 132 is preferably overlaid over the first face (e.g., distal the light emitters), but can alternatively be integrated into the first face (e.g., wherein the first face is capacitive or resistive), line the first face interior (e.g., proximal the light emitters), or be otherwise mounted to the housing. Alternatively, any portion of the lighting system, the housing, or any additional housing, may include a touch-sensitive surface 132. Preferably, the touch-sensitive surface 132 is a touch screen panel. Alternatively, the touch-sensitive surface 132 may be a button, a bevel, a frame, a touch pad, or any other element or combination of elements which receives tactile input. Preferably, the touch-sensitive surface 132 uses capacitive technology for tactile detection, but can alternatively use resistive technology. Alternatively, the touch-sensitive surface 132 may use infrared, capacitive, surface acoustic wave (SAW), or any other technology for tactile detection. In some variations, the touch-sensitive surface 132 includes its own control module, wherein the touch control module can be communicatively connected to the lighting system unit control module or to any other suitable endpoint. In one variation, the tactile cues received by the touch-sensitive surface 132 are from a user, preferably applied with a finger. These inputs could include such things as a tap, a swipe, a dragging motion, or any other suitable set of input gestures. The inputs can be received at one or more lighting system units, contemporaneously or asynchronously. In one example, the touch-sensitive surface 132 receives a series of finger swipes, simulating the strokes of a paintbrush, wherein the series of finger swipes is assigned as a region selection within a lighting system unit. In another example, a tap on the touch-sensitive surface 132 is assigned as a color selection, wherein the color selection is based on the color assignment of the controllable zone closest to the location of the tap.

Input elements can additionally or alternatively include: a mouse, a keyboard, a motion sensor, a microphone, a biometric input, a camera, a button, an accelerometer or inertial measurement unit (IMU), a gyroscope, a temperature sensor, a data communication system (e.g, Wi-Fi), or any other suitable input. In one example, a voice-activated household speaker serves as an input element to the lighting system, wherein the voice-activated household speaker receives verbal commands from a user (e.g. 'change the first controllable zone to the color yellow') and communicates the verbal commands to a control module associated with the lighting system. Each lighting system unit preferably includes at least one input element, but alternatively there can be a single input element (or user interface) for the lighting system, multiple inputs per lighting system unit, or any other suitable number of inputs. In a specific example, the lighting system unit includes a touchscreen overlaid over a broad face (e.g., active face, light-emitting face, etc.) of the lighting system unit. However, the input elements can be otherwise arranged.

The lighting system can optionally include an output element, which functions to transmit, present, display, or otherwise communicate data pertaining to the operation of the controllable dynamic lighting system. Output elements can include: displays (e.g., LED display, OLED display, LCD, etc.), audio speakers, lights (e.g., LEDs), tactile outputs (e.g., a tixel system, vibratory motors, etc.), a data communication system (e.g., the WiFi radio), or any other suitable output element. In one variation, an application on a user device 160 (e.g. tablet), or the user device 160 itself, serves as an output element of the lighting system. this application on a user device can additionally or alternatively serve as an input element. Each lighting system unit preferably includes at least one output element, but alternatively can include multiple output elements, a single output element for the lighting system as a whole, or any other suitable number of output elements.

The system is optionally operated and/or controlled by and/or in cooperation with a client (client application). The client preferably runs on a user device 160 (e.g. mobile device), but can alternatively run on any other suitable computing system. The client can be a native application, a browser application, an operating system application, or be any other suitable application or executable. The client can perform all or a portion of the processes discussed below.

Examples of the user device 160 include a tablet, smartphone, mobile phone, laptop, watch, wearable device (e.g., glasses), or any other suitable user device. The user device 160 can include power storage (e.g., a battery), processing systems (e.g., CPU, GPU, memory, etc.), user outputs (e.g., display, speaker, vibration mechanism, etc.), user inputs (e.g., a keyboard, touchscreen, microphone, etc.), a location system (e.g., a GPS system), sensors (e.g., optical sensors, such as light sensors and cameras, orientation sensors, such as accelerometers, gyroscopes, and altimeters, audio sensors, such as microphones, etc.), data communication system (e.g., a Wi-Fi module, BLE, cellular module, etc.), the system disclosed in U.S. application Ser. No. 15/501,699 filed 3 Feb. 2017 incorporated herein in its entirety by this reference, or any other suitable component.

The controllable dynamic lighting system can additionally include a communication system (or subsystem). The communication system can function to send and/or receive data to and/or from one or more endpoints. The endpoints can include: remote computing systems (e.g., servers), user device(s), secondary controllable dynamic lighting system(s), appliance(s) (e.g., TVs, stereos, etc.), secondary sensors (e.g., motion sensors, cameras, etc.), auxiliary sensors (e.g., temperature sensors, light sensors, proximity sensors, motion sensors, such as accelerometers and gyroscopes, etc.), the controlling mean(s) of the lighting system (e.g., lighting element device controller, lighting system unit controller, etc.), or any other suitable set of endpoints. The data can include operation data (e.g., operation parameters for each controllable zone, light emitting unit, etc.), configuration data, or any other suitable data. The communication system can include one or more radios or any other suitable component. The communication system can be a long-range communication system, a short-range communication system, or any other suitable communication system. The communication system can facilitate wired and/or wireless communication. The communication system is preferably electrically connected to the control module of the lighting system and/or lighting system unit, but can be wirelessly connected or otherwise connected to the control module. In one example, the communication system is collocated with and connected to the control module for the lighting element device, which can be arranged in the same or different housing as the lighting system unit. In a second example, each lighting system unit includes a communication system. Examples of the communication system include: 802.11x, Wi-Fi, Wi-Max, WLAN, NFC, RFID, Bluetooth, Bluetooth Low Energy, BLE long range, ZigBee, cellular telecommunications (e.g., 2G, 3G, 4G, LTE, etc.), radio (RF), microwave, IR, audio, optical, wired connection (e.g., USB), or any other suitable communication module or combination thereof.

The controllable dynamic lighting system can optionally include sensors. Sensors can include: cameras (e.g., visual range, multispectral, hyperspectral, IR, stereoscopic, etc.), orientation sensors (e.g., accelerometers, gyroscopes, altimeters), acoustic sensors (e.g., microphones), optical sensors (e.g., photodiodes, etc.), temperature sensors, pressure sensors, flow sensors, vibration sensors, proximity sensors, chemical sensors, electromagnetic sensors, force sensors, smoke sensors (e.g. smoke detector), or any other suitable type of sensor. The sensors can be modular components connectable to the lighting system unit, be integrated into the lighting system unit (e.g., wherein each lighting system unit includes one or more sensors), or be otherwise associated with the controllable dynamic lighting system. In one example, the lighting system unit further includes a smoke sensor, wherein the smoke sensor activates the light emitters to project flashing red light in the event of a fire.

The controllable dynamic lighting system can optionally include a power supply. The power supply can be a wired connection, wireless connection (e.g., inductive charger, RFID charging, etc.), a battery (e.g., secondary or rechargeable battery, primary battery, etc.), energy harvesting system (e.g., solar cells, piezoelectric systems, pyroelectrics, thermoelectrics, etc.), or any other suitable system. Power can additionally or alternatively be supplied by AC wall power. The power supply can be modular components connectable to the lighting system unit, be integrated into the lighting system unit (e.g., wherein each lighting system unit includes one or more power supplies), or be otherwise associated with the controllable dynamic lighting system.

In variations including location data and/or location information, the system (and/or portions thereof) can include a location system (or locating mechanism). The location system can include a GPS unit, a GNSS unit, a triangulation unit that triangulates the device location between mobile phone towers and public masts (e.g., assistive GPS), a Wi-Fi connection location unit, a WHOIS unit (e.g., performed on IP address or MAC address), a GSM/CDMA cell identifier, a self-reporting location information, or any other suitable location module or subsystem.

2. Method

Figure 5:
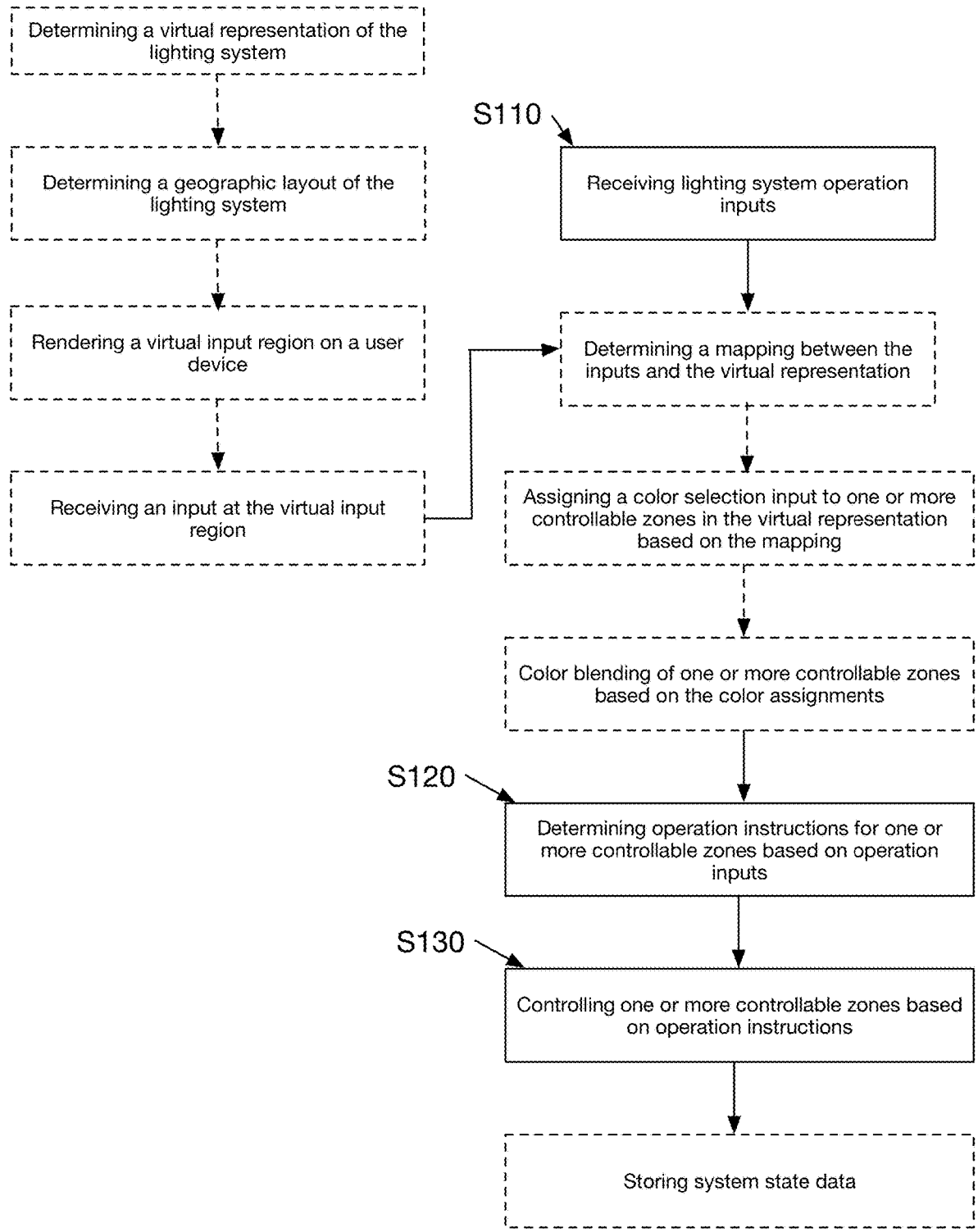
FIG. 5 is a flowchart diagram of the method of controlling a lighting system.

The method for controlling a lighting system functions to enable dynamic, flexible, interactive, and/or responsive control of a lighting system. As shown in FIG. 5, the method includes: receiving lighting system operation inputs S110, determining operation instructions for one more controllable zones based on the operation inputs S120, and controlling controllable zone operation based on the respective operation instructions S130.

The method is preferably performed by, using, and/or in cooperation with the controllable dynamic lighting system described above. However, the method can alternatively be performed using any other suitable controllable lighting system, such as that disclosed in U.S. application Ser. No. 15/458,212 filed 14 Mar. 2017, which is incorporated herein in its entirety by this reference. Additionally or alternatively, the method can be performed with a user device, a remote computing system (e.g., a server), or any other suitable computing system.

The method is preferably performed in real time, but can additionally or alternatively be performed in near (substantially) real time, asynchronously, upon activation by a trigger (e.g., after a user presses a "play" button, a user walks into a room associated with the lighting system, etc.), a combination of the aforementioned, or with any other suitable temporal characteristics.

Figure 6:
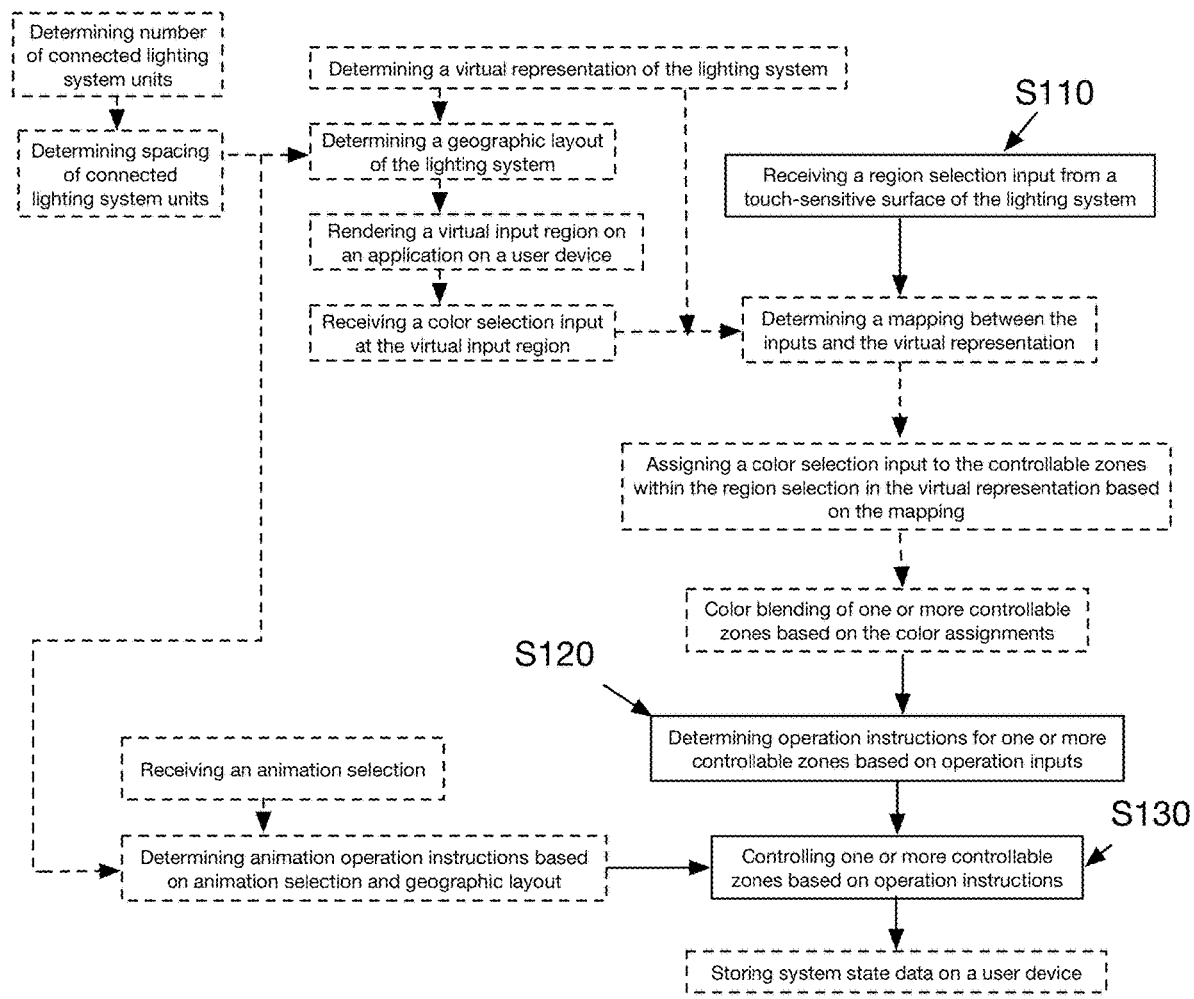
FIG. 6 is a flowchart diagram of an example of the method.

Receiving lighting system operation inputs Silo functions to determine the light properties of the lighting system. Preferably, the lighting system receives a region selection (e.g. as shown in FIG. 6), wherein a region selection includes one or more controllable zones in a lighting system. The region selection can be received from any suitable device, such as a touch-sensitive surface, an application on a user device, or any other element. In one variation, the region selection is received by a control module associated with a light emitting unit; alternatively, the region selection can be received by any suitable control module associated with the lighting system. In one example, the region selection is received from a remote computing system (e.g., manufacturer server system, third-party server, etc.).

In one variation, the lighting system receives a color selection, wherein the color selection specifies a color value of the light emitted by the light emitters within the region selection. Preferably the color selection includes a color hue; additionally or alternatively, the color selection specifies other properties of the light emitted by the light emitters, such as intensity, saturation, etc. In one variation, the color selection is chosen by a user. Alternatively, the color selection may be determined through artificial intelligence, received from a database, determined based on the output of a sensor, calculated, selected from a table, or determined in any other way. The color selection can be received from any suitable device, such as a touch-sensitive surface, an application on a user device, or any other element. In one variation, the color selection is received by a control module associated with a light emitting unit; alternatively, the control selection can be received by any suitable control module associated with the lighting system. In one example, the control selection is received from a remote computing system. In one variation, the region selection and the color selection are received from the same source. For example, the region selection and color selection may both be received from a control module associated with a touch-sensitive surface. Alternatively, the region selection and the color selection may be received from different sources. For example, the region selection may be received a control module associated with a touch-sensitive surface, while the color selection is received from an application on a user device separate from the touch-sensitive surface.

Determining operation instructions for one or more controllable zones based on the operation inputs S120 functions to translate inputs to the lighting system into actionable commands to be performed by the lighting system. Preferably, S120 is performed using a virtual representation of the lighting system. Alternatively, S120 may be performed in any suitable way. The operation instructions can be: calculated, selected (e.g., from a list or predetermined library), estimated, translated, or otherwise determined based on the operation inputs.

Figure 7:
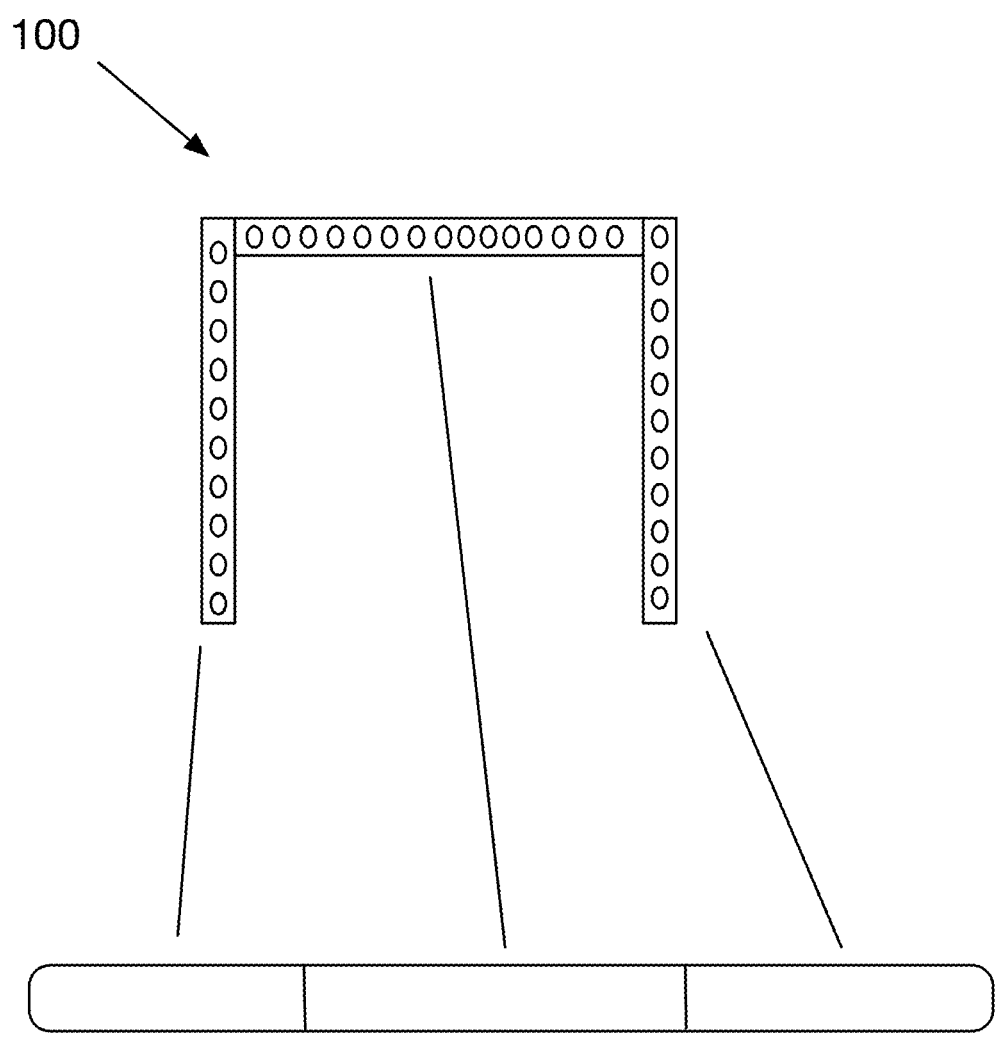
FIG. 7 is an example of a virtual representation of a lighting system.
Figure 9:
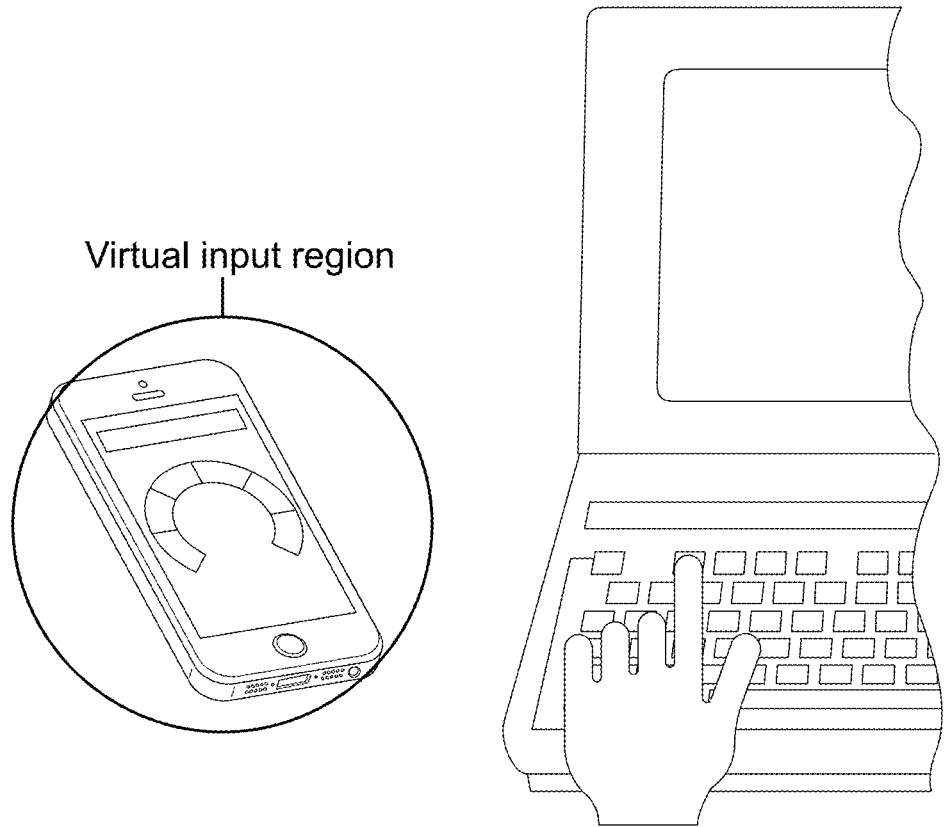
FIG. 9 is a depiction of an example implementation of the virtual input region.
Figure 12:
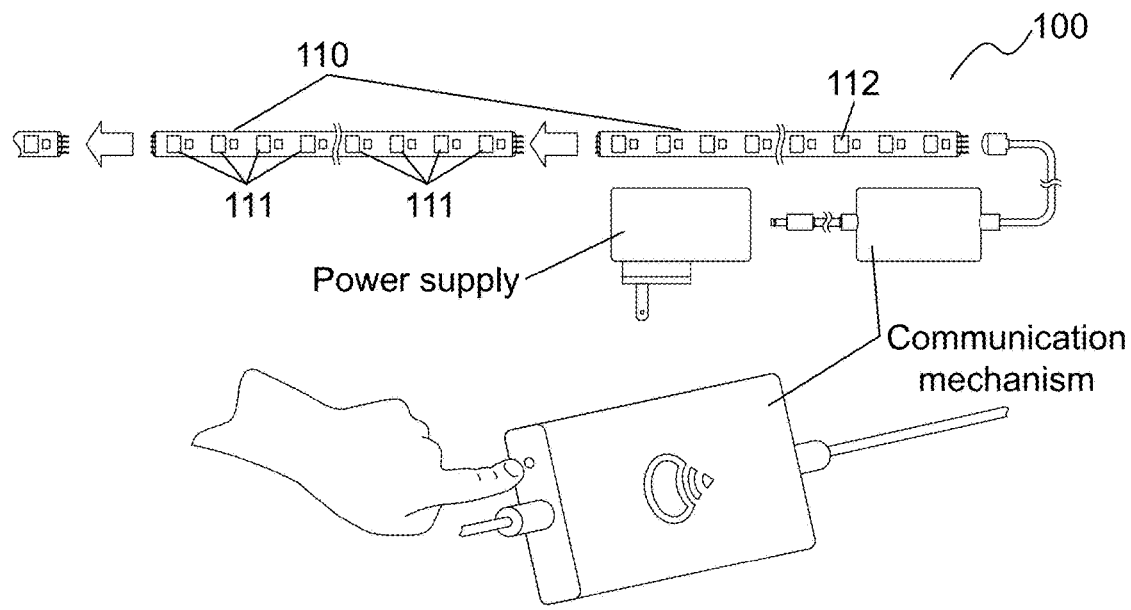
FIG. 12 is a depiction of the expandability of an embodiment of the lighting system.

The method may further include determining a virtual representation of the lighting system (e.g. FIG. 7), wherein the virtual representation functions to enable a mapping to be made between inputs and the lighting elements to which those inputs will be applied. The virtual representation of the lighting system preferably includes a set of indices, wherein the set of indices preferably identifies a set of controllable lighting elements in the lighting system, such as a set of controllable zones. The controllable zone is preferably the set of physical light emitting units within a lighting system unit, but can additionally or alternatively be a virtual representation of said set of physical light emitting units. The indices for the controllable zones can be determined as discussed above, but can be otherwise determined. Alternatively, any other single-indexing scheme, double-indexing scheme, other indexing scheme, or combination of indexing schemes may be used in the method. Preferably, the indexing scheme is predetermined (e.g., stored by the lighting system, a remote computing system, the client, etc.), and the indexing scheme is stored in a control module. Alternatively, the indexing scheme may be dynamically determined. In one example, each time a new light emitting unit is added in a modular system, a new or expanded-upon indexing scheme is determined. Alternatively, the indexing scheme may be determined by a user, or determined in any other way. In some variations, the virtual representation includes a virtual input region, wherein the virtual input region functions to provide input options to a user, preferably through a display (e.g. as shown in FIG. 9).

Preferably, the virtual input region functions to display, at a user device, a graphical representation of various control input options available to the user, such as, but not limited to, one or both of the region selection and the color selection. Rendering the virtual input region is preferably performed by a client application (e.g., native application, web application, etc.) operating on a user device (e.g., smartphone, cell phone, etc.), but can alternatively be performed by any suitable application operating on any suitable computing system. In one variation, rendering the virtual input region is performed by a control module associated with a touch-sensitive surface of the lighting system, and displayed by a set of light emitters located distal to the touch-sensitive surface. A virtual input region preferably includes a plurality of predefined control regions (e.g. controllable zones), each rendered in an ordered fashion at a display of the user device; however, the virtual input region can alternatively include a single predefined control region, a plurality of dynamically defined (i.e., not predefined) control regions, or any other suitable control regions. The control regions are preferably each of similar size (e.g., physical extent) and shape, but can alternatively include different size(s) and/or shape(s). The control regions of the virtual input region are preferably separate and distinct regions, but can alternatively overlap. The control regions (and/or other regions of the virtual input region) can be represented, for example, by a pixel or set of pixels of the display, a tixel (i.e., touch pixel) or set of tixels of the touch-sensitive display, a touchscreen unit, or any other suitable screen region.

Each control region of the virtual input region can be associated with a set of controllable zones on the physical controllable dynamic lighting system, wherein the control region's lighting system parameters are displayed on the corresponding controllable zone of the controllable dynamic lighting system. The association between the control region and the controllable zones can be predetermined (e.g., pre-mapped, automatically mapped based on the number of controllable zones in the overall controllable dynamic lighting system), dynamically determined, or otherwise determined. The association can be determined in real-time (e.g., as inputs are received), predetermined (e.g., in response to user device connection to the controllable dynamic lighting system, retrieved from a remote computing system, etc.), or determined at any suitable time and/or in response to occurrence of any other suitable event. The association can be determined by the user device, a controllable dynamic lighting system control module, a lighting system unit control module (e.g., wherein the lighting system unit receives lighting parameters for the virtual input segment corresponding to the lighting system unit, wherein the lighting system unit subdivides the virtual input segment into individual controllable zones, etc.), or by any other suitable system.

In a first variation, rendering the virtual input region can include rendering a default graphical representation (e.g., a bar). In this variation, the operation inputs can be: scaled based on the number and configuration of the lighting system units within the lighting element device; isolated to a lighting system unit having similar dimensions or other properties to the default representation; or otherwise managed. In a related variation, a graphical representation of a distribution (e.g., physical distribution and/or arrangement) of lighting system units of the lighting system can be determined, and rendered. In another related variation, a graphical representation of a number of lighting system units can be determined and rendered.

In a second variation, determining the virtual input region can include receiving data from the connected lighting system. In a first example, received data can include a schematic layout transmitted from one or more lighting system units, which is then rendered at the display. In a second example, the data can include the lighting system unit identifiers and sensor data (e.g., individual lighting system unit proximity to a second lighting system unit within the connected lighting system), wherein the lighting system unit form factors can be determined from the identifiers and the relative orientation of different lighting system units within the connected lighting system can be determined from the sensor data. The data can be collected by the user device, a connected lighting system control module, the lighting system unit control module(s), or from any other suitable system. In a third example, the client application can connect to several smart devices, and a "handshake" between the client and each device can include type data (e.g., what type of device, such as a light strip, a light panel, an input-enabled light system unit, etc.) that is then used to render graphical abstractions of each device type at the display of the user device in the virtual input region. In a second variation, determining the virtual input region can include receiving a user input (indicative of connected lighting system parameters) at the client application. The user input can be a user selection from a menu of selectable connected devices, a previously saved user profile which includes device information, or any other suitable user input, and used to determine the virtual input region. In a third variation, the virtual input region can be dynamically calculated from a combination of parameters received from the user at the user device (e.g., at the client application) and parameters/data received from elements of the connected lighting system.

Schematic layouts of the lighting element device (e.g., graphical representations) can be stored within the client application, within a control module (e.g., a local control module, a master control module, etc.), at a remote computing system (e.g., server system), or a similar suitable computing system. The schematic layout can be associated with a user profile, wherein the user profile is retrieved from the client application, the user device, a remote server 170, or any other suitable endpoint. The schematic layout can be received from connected elements of the lighting system and/or other devices, which possess information regarding their relative arrangement and/or orientation and report this information to the client application upon being queried. Such devices can be connected to the user device and/or client application by way of Bluetooth, by connecting to the same local area network (e.g., Wi-Fi network, mesh network), or by way of any other suitable wireless/wired connection. Additionally or alternatively, the schematic layout can be input manually by the user (e.g., by dragging graphical representations of components into a specific layout at a touch-sensitive display) or semi-manually, such as from a selectable list of connected/paired devices. Additionally or alternatively, schematic layouts can be automatically determined. Schematic layouts can be stored prior, subsequently, or simultaneously to being received.

In some variations of the method, the method further includes receiving an input at the virtual input region, which functions to accept input instruction(s) from an entity (e.g., the user) at the user device, for use in subsequent blocks and/or subprocesses. This can include selecting a color or color parameter (e.g., hue, saturation, intensity, etc.) from a set of displayed colors or color parameters. For example, this can include dragging a color swatch from a set of color swatches (displayed at the virtual input region) onto a control region of the graphical representation of the lighting system. In another example, a color is selected and then 'painted' over a spatial area on the virtual input region. Inputs can be received via touch, voice, conventional computer control inputs (e.g., a mouse, keyboard, etc.), or by any other suitable inputs.

Receiving an input at the virtual input region can include displaying control options. Displaying control options functions to display the various options for controlling the system to the user. Control options can include color data, such as swatches of color hues, brightness and/or saturation gradient sliders/selectors, a color selection wheel, or any other suitable color data to be used as control options. Control options can also include physical position data, such as the physical regions to be controlled. Control options are preferably displayed with a linear relationship between control regions (at the virtual input region) and controllable zones (at the physical lighting system), but can alternatively be displayed with a nonlinear relationship, or any other suitable functional relationship between the control regions and the controllable zones. There is preferably a 1:1 correspondence between control regions and controllable zones, but the system can alternatively have any suitable correspondence. Further options for presenting and receiving color options are demonstrated in U.S. patent application Ser. No. 14/782,866, filed 7 Oct. 2015, which is incorporated in its entirety by this reference.

Control data can also include a set of "scenes", which are preset and/or predefined combinations of colors, gradients, and other parameters. These scenes can be manually set by the user as combinations of other control inputs, and then saved into retrievable scenes, which can be reapplied (e.g., to the lighting system, other lighting systems with the same layout or different layouts). When the executing lighting system has a different layout from the scene's layout, the scene parameters (e.g., color, region mapping, etc.) can be scaled (e.g., up or down), randomly adjusted or reassigned, sampled (e.g., based on lighting system sensor signals, user preferences, randomly, etc.), or otherwise reconfigured to fit the executing lighting system's configuration. Scenes can be associated with activities, such as reading, watching television, dining, art showcases, or any other suitable register of operation context. Each activity can correspond to specific configurations and/or combinations of light parameters and color settings. Color data can also include action data, which can include animations (e.g., turning lights on and off, twinkling lights, smooth color shifting, etc.) and/or scheduling (e.g., certain light or color behaviors can be scheduled to occur at certain times, such as red-shifting the ambient light at night time). Preferably, the timing, speed, and other parameters of the animations are determined based on the layout information for the system. In one variation, for instance, the spacing between lighting system units is used to coordinate spatial animation between physically separated lighting system units (e.g., designate an offset time, wherein the offset time specifies how much time passes from when the last activated controllable zone(s) on a first lighting system unit experience a color change to when the first activated controllable zone(s) on an adjacent lighting system unit experience a color change). The effect of the offset time, in one example, allows the negative space between the lighting system units to effectively be included in the animation. In another variation, the directionality of the color change in a modular lighting system is determined by the arrangement of lighting system units. For example, if the lighting system units are arranged in a vertical column, the color change pattern might progress from the top lighting system unit to the bottom one, or vice versa. Alternatively, if the lighting system units are arranged in a horizontal row, the color change pattern might instead progress from the leftmost lighting system unit to the rightmost. Alternatively, the user may prescribe a directionality, timing sequence, or other parameter for the lighting system. In one variation, a lighting system unit having an input element (e.g. accelerometer) detects a user touch input (e.g. tap) on the lighting system unit; the control module of this lighting system unit then prescribes an animation pattern (e.g. a ripple) to propagate among the other lighting system units in a predetermined sequence. In one example, the lighting system unit that receives the user touch input is associated with the master control module, but alternatively, any lighting system unit associated with any control module can receive the user touch input and control its propagation among the other lighting system units.

Figure 20:
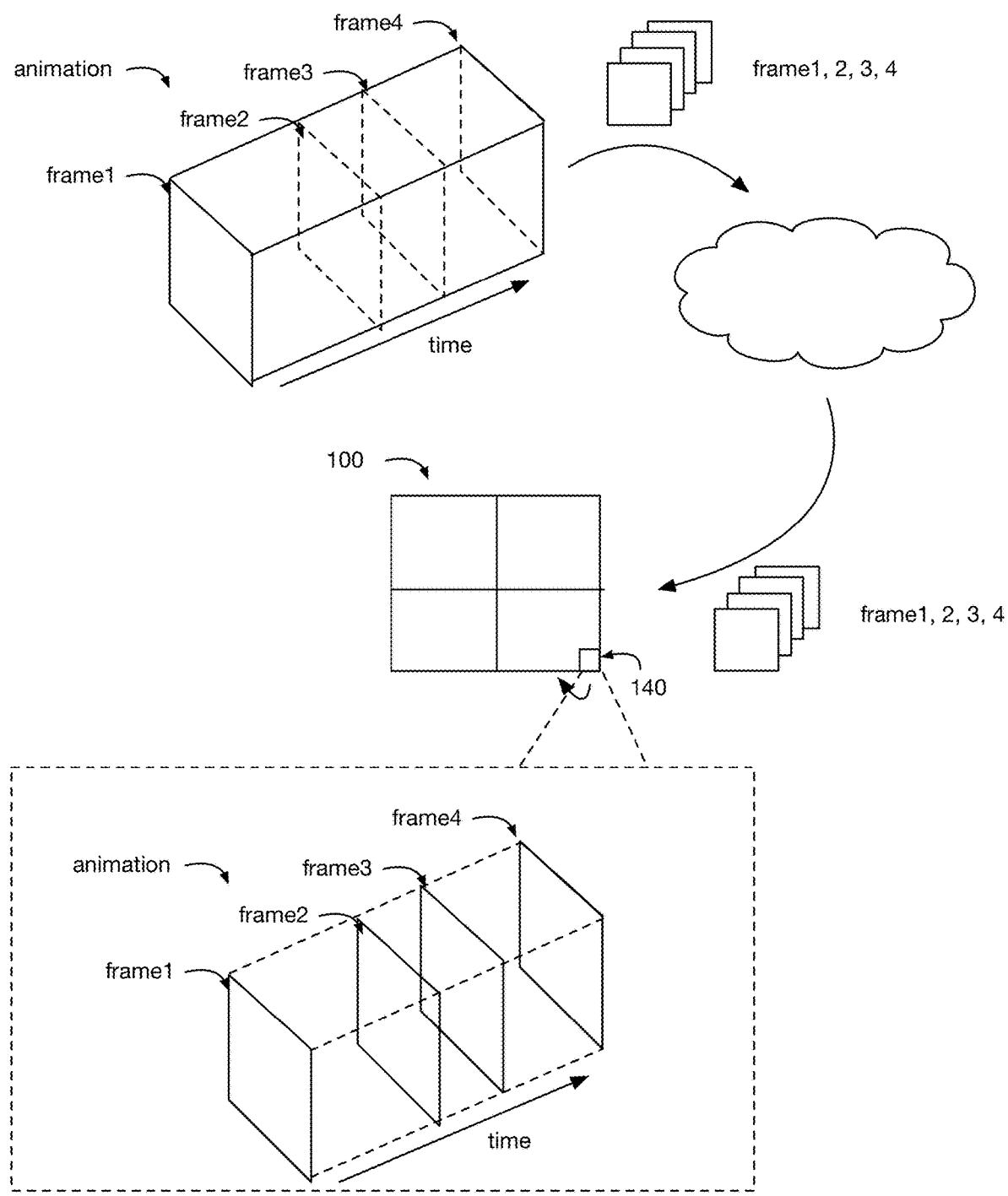
FIG. 20 is an example of representing an animation in a low-resolution format.

In one variation, an animation in the lighting system is represented in a predetermined, discrete number of temporally-spaced frames (e.g., 15 frames, each separated by an equal or unequal temporal duration, wherein the separation duration can be predetermined, determined based on the spatial variance between sequential frames, or otherwise determined), which are transmitted to the control module of a lighting system unit to be reconstructed into a smooth animation (e.g., wherein interstitial frames are interpolated, extrapolated, or otherwise generated by the lighting system unit's control module, the main control module, etc.), an example of which is shown in FIG. 20. However, the animation can be represented by an equation, a series of frames fully representing the animation, or otherwise represented. The frames (e.g., color assignments of the controllable zones in each frame) can be determined by or passed through a cloud-based server, a user device, or any other suitable computing system. In one variation, each of the frames is a reduced-resolution representation of a lighting system unit (e.g., an 8×8 frame), wherein the lighting system can scale the representation (e.g., through interpolation, extrapolation, etc.) to substantially match the lighting system dimensions. Alternatively, the frame can be a full-resolution representation (e.g., include as many pixels or units as the lighting system has controllable zones), or be any other suitable representation of the animation.

Light emitting units of the lighting system can optionally include secondary user interface(s) that communicate user inputs to the client application. Accordingly, the client application can dynamically update the virtual input region to reflect the state of the light emitting units (e.g., the color state, intensity state, etc.). In a specific example, the light emitting unit includes a user input, such as a touch-sensitive interface (e.g., a capacitive touch screen) or any suitable input discussed above, that allows a user to input color data through a touch input. Upon receiving a user input at the touch sensitive interface, the lighting system transmits the user input to the client application or other control system, which dynamically updates the virtual input region to reflect the color data input by the user at the light emitting unit.

Generating a virtual representation of the lighting system based on the input functions to represent the effect of the input on the lighting system to the user. This is preferably performed in real time or near real time, as well as automatically in response to the receipt of the input at the virtual input region. However, it can alternatively be performed asynchronously in time, and/or in response to a trigger (e.g., upon receipt of a command to "update" the virtual representation). The virtual representation of the lighting system can be the virtual input region, including the input parameters (e.g., the input color at the input position). Additionally or alternatively, the virtual representation can be distinct from the virtual input region.

Figure 13:
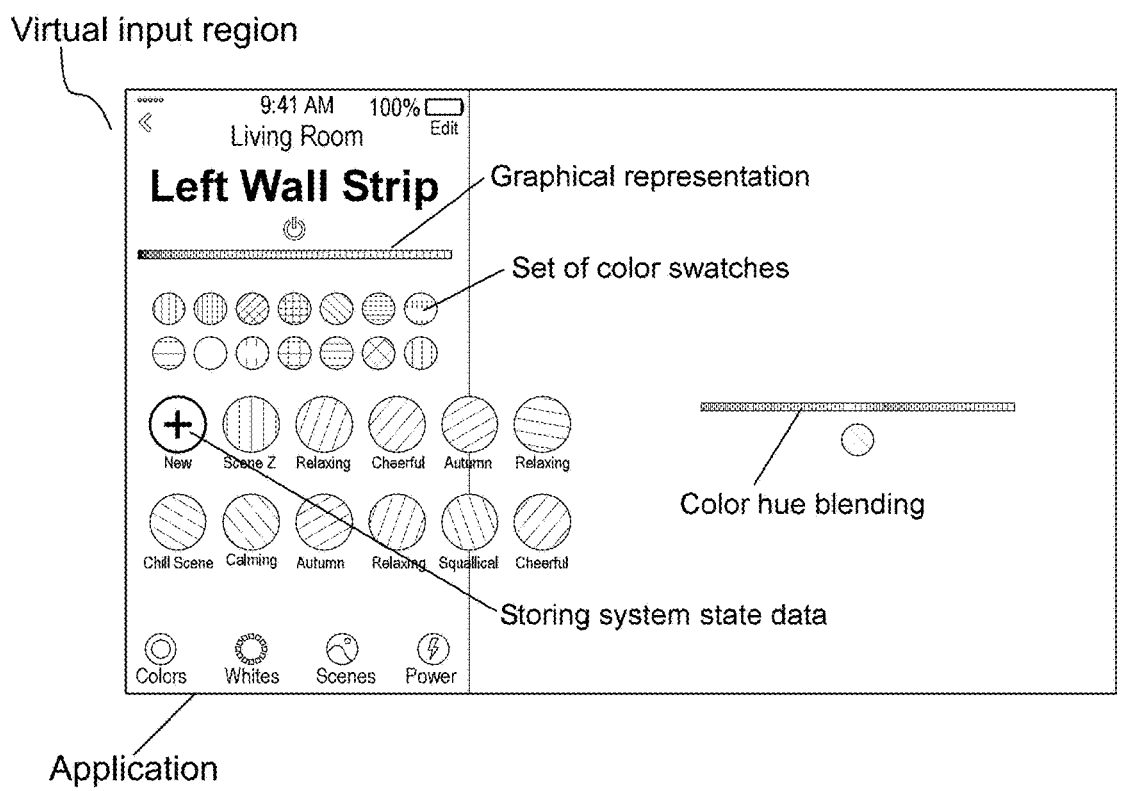
FIG. 13 is an illustration of an example implementation virtual input region in an application on a user device.
Figure 14:
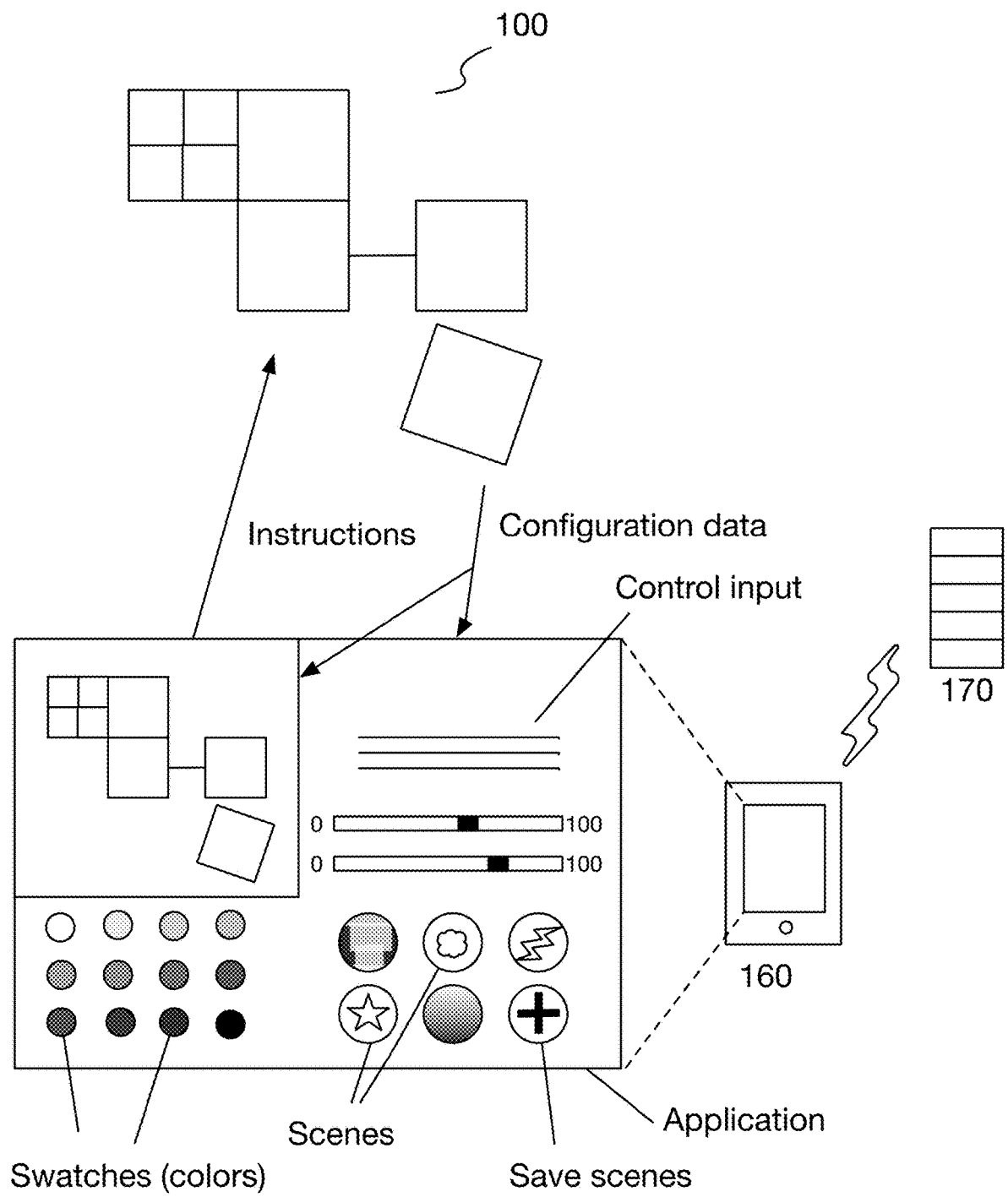
FIG. 14 is a schematic depiction of data flow through an example embodiment of the lighting system and method.
Figure 15A:
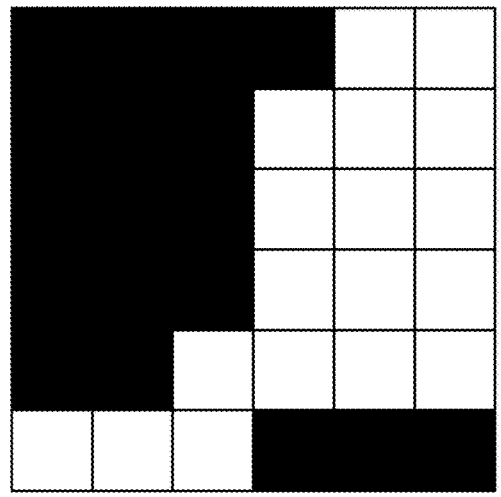
FIGS. 15A-15D are example implementations of color blending.
Figure 15B:
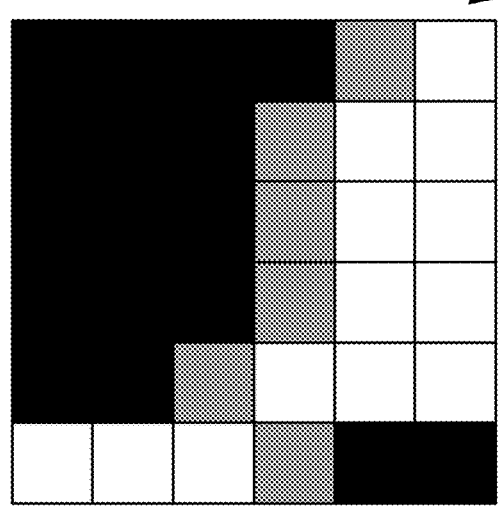
Figure 15C:
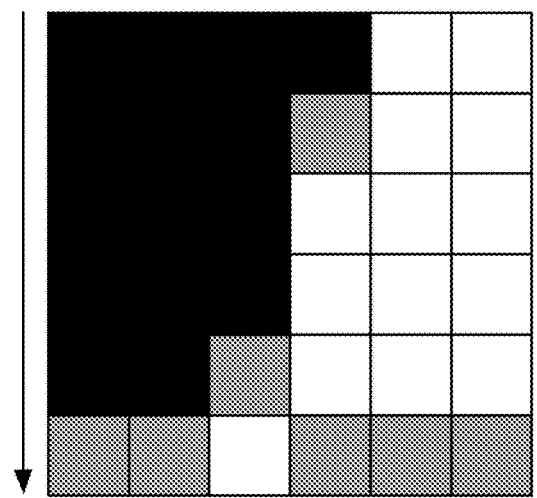
Figure 15D:
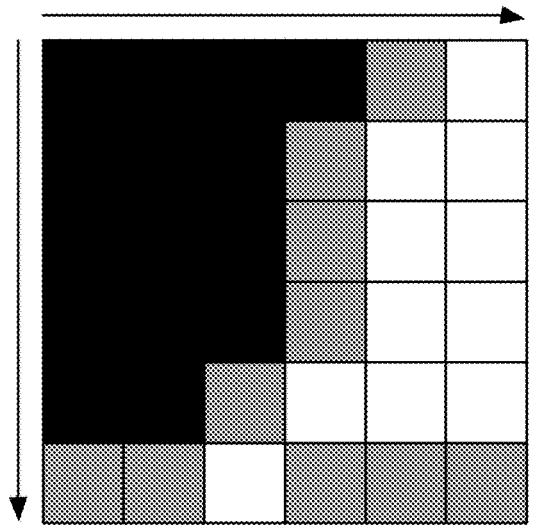
Figure 16A:
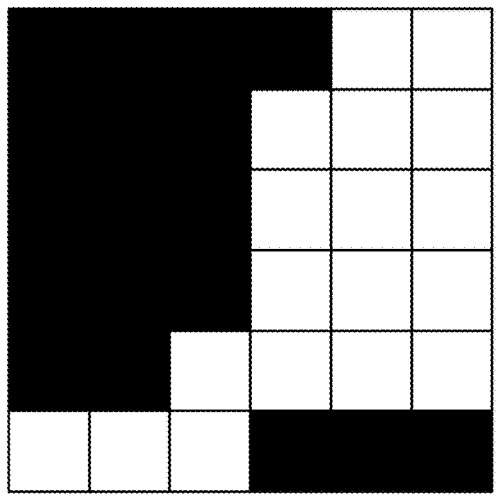
FIGS. 16A-16D are example implementations of color blending.
Figure 16B:
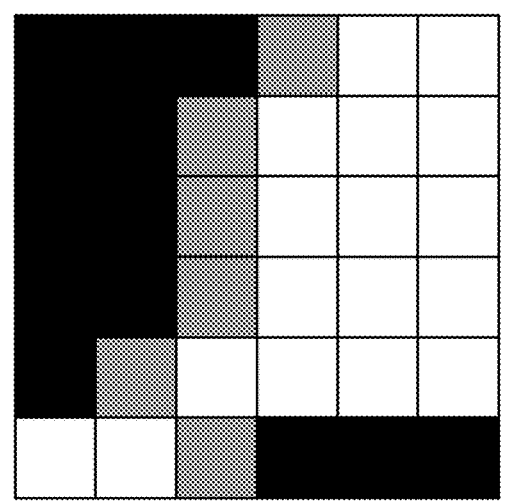
Figure 16C:
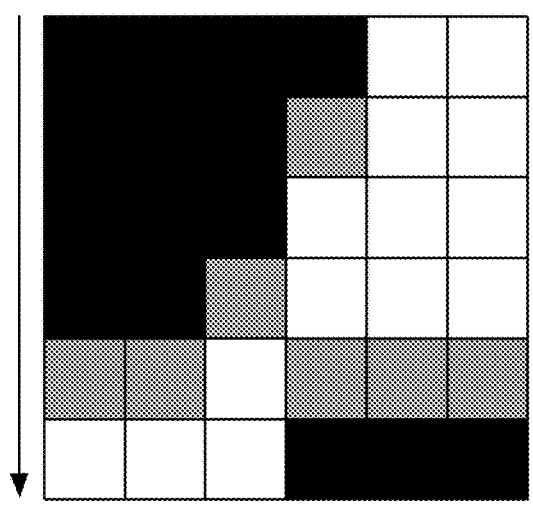
Figure 16D:
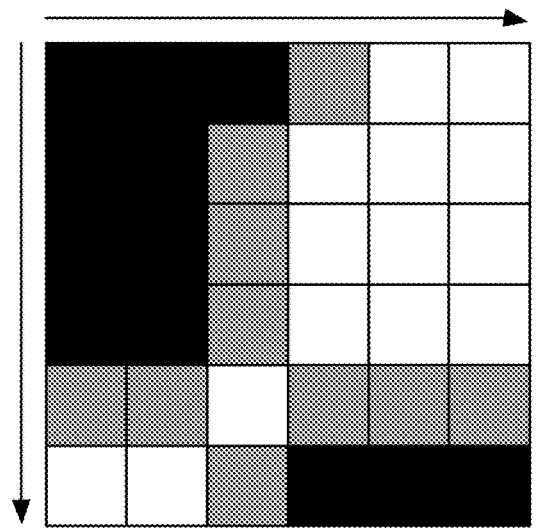

Rendering the virtual input region can optionally include determining the virtual input region and rendering the determined input region on the input device (e.g., user device). The virtual input region can include a set of control options (e.g., color parameters) (e.g. as shown in FIG. 13), a graphical representation of the lighting system (e.g. as shown in FIG. 14), and/or any other suitable information. The graphical representation can include a number and/or relative arrangement of the constituent lighting system units, a virtual representation of a single lighting system unit of the lighting system, an abstraction of the lighting system (e.g., a strip, bar, etc.), or any other suitable representation. The graphical representation preferably includes a set of input zones, each corresponding to a controllable zone within the lighting element device. However, an input zone can be mapped to multiple controllable zones, a portion of a controllable zone, overlap a first and second controllable zone, or be otherwise related to the controllable zones.

The input region and/or parameters thereof (e.g., location on the input device, displayed information, etc.) can be predetermined, determined based on configuration data, determined by a user, or be otherwise determined. The input region is preferably updated (e.g., re-determined and re-rendered) as the operation parameters and/or distribution or arrangement of lighting elements within the system is adjusted (e.g., lighting system units are added/removed from the lighting system), in response to receipt of a manually entered update instruction, or at any other suitable time. Preferably, such updating is performed in real time or near real time, but can alternatively be performed in asynchronously. For example, the input region can be adjusted in near-real time to reflect: the number lighting system units cooperatively forming the controllable dynamic lighting system; configuration data, such as the physical layout (e.g., position, orientation, etc.) of lighting system units within the controllable dynamic lighting system (e.g., as determined based on RSSI, force sensors within the lighting system units, which connectors are being used and the corresponding lighting system unit face, etc.); or to reflect any other suitable system parameter. Alternatively, the input region may be determined at predetermined intervals and/or asynchronously, or in any other suitable manner with respect to temporal behavior.

Determining the configuration information of the lighting system preferably includes determining the number of lighting system units in a modular lighting system. Configuration information can include the physical arrangement of the lighting system units (e.g., schematic layout, physical layout, relative layout, etc.), the geographic location of the lighting system units, the connectivity of lighting system elements in relation to one another, or any other suitable data related to the arrangement of the lighting system. Configuration information can additionally or alternatively include any data related to the lighting system, including: number of lighting system elements, the state of the lighting system (e.g., the illumination intensity, color/hue, on/off state, etc., of light emitting units of the lighting system), or any other suitable data. The configuration data can be received from an auxiliary device, received from the lighting system unit, automatically generated (e.g., based on contextual data), or otherwise determined.

Figure 18:
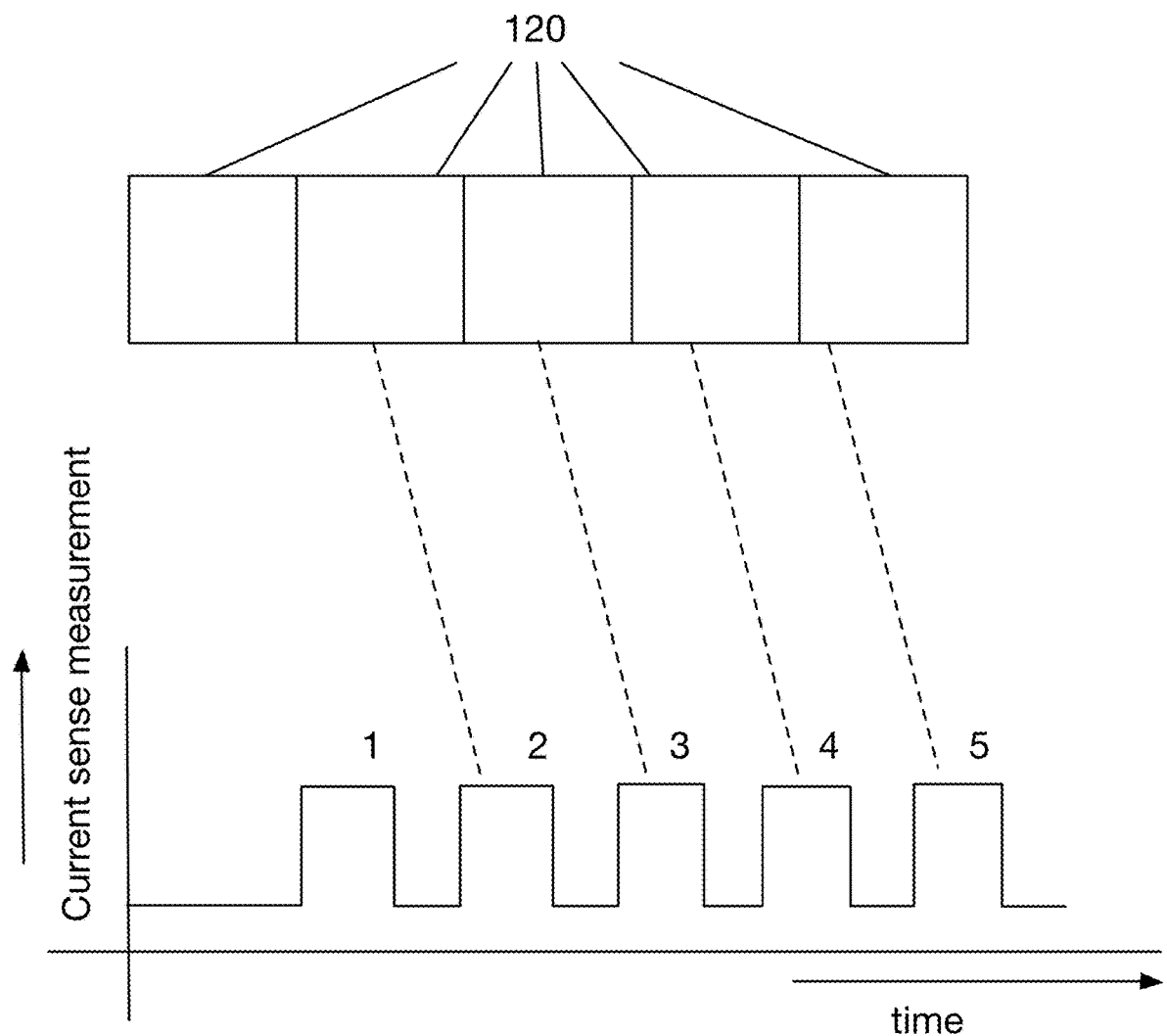
FIG. 18 is an example implementation of geographic layout determination.

In one variation, the number and/or layout of lighting system units is preferably determined through current-sensing methods, wherein a current value (e.g. current draw, change in current, etc.) is measured during a sequential powering of controllable units in the lighting system, wherein the current value measurement can be correlated to a number of controllable units (e.g. controllable zones, light emitting units, etc.). In one example of this variation shown in FIG. 18, the method further includes any or all of the following steps: sending a series of input pulses (e.g. voltage, current, light, etc.) to the lighting system unit(s), measuring a current value after each input pulse is applied, determining a number of controllable units based on the current values, and repeating any or all of the previous steps until no current is drawn. Alternatively, a power value (e.g. power draw), voltage value, resistance value, any other value, or any combination of values is measured during the determination of number of lighting system units. Additionally or alternatively, the method for determining the number of lighting system units may include any or all of the following steps: powering the entire lighting system, determining a power value (e.g. power draw, current, voltage) or a change in the power value, correlating the power value or the change in the power value with a number of controllable units. Additionally or alternatively, the number of controllable units may be determined with the use of a central data bus (e.g. a 2-way data bus), wherein the controllable units notify a control module through a central data bus that they are connected to another controllable unit (e.g., wherein the connection and/or number of downstream lighting system units can be determined using the current-sensing methods, connection detection methods, or any other suitable method). In a third variation, determining the physical layout of the lighting system includes determining the physical arrangement of lighting system units (e.g., spatial separation between lighting system units), or any other lighting system elements, in a modular lighting system. In second variation, this is done through a resistance-based method, wherein a resistance value is measured at each end of a connector, wherein the connector connects two lighting system units together, wherein the resistance values are used to determine a length of the connector. Alternatively, the length of the connector between light emitting units may be predetermined and stored in a control module, wherein a connector identifier (e.g., connector port, transmitted connector identifier, etc.) can be used to retrieve the connector length. Further alternatively, the signal strength of communication between a light emitting unit and a central data bus may be assessed to determine a distance between lighting system units. In a third variation, determining the physical layout may involve receiving a transmitted physical layout. Determining the physical layout can additionally or alternatively include using video and/or image capture of the layout (e.g., via a client application running on a user device) using image-based object recognition techniques to identify individual lighting system units and their relative positions (e.g., based on lighting-system-unit-specific emitted light properties such as color, brightness, physical packaging shape, visible and/or invisible light modulation signatures, etc.). In one example, a physical layout of a lighting system is determined through an image (e.g. taken on a user device), wherein the known dimensions of a light emitting unit or other element in the lighting system are used to determine the distance between lighting system units. In a fourth variation, lighting system units can include directional lighting sensors configured to detect the light properties (e.g., color, brightness, temporal modulation, etc.) of proximal (e.g., adjacent, nearby, neighboring, etc.) lighting system units to enable collection of geospatial and/or identifying information about the proximal lighting system units (e.g., location, direction, distance, lighting system unit type, identity, etc.). In a fifth variation, the number and/or layout of the lighting system units is manually entered (e.g., wherein a user drags and drops virtual representations of the lighting system units or otherwise enters the layout information). Alternatively, the physical and/or spatial layout of the lighting system can be determined by any other suitable means.

Generating control instructions based on the input functions to translate the input, which can include multiple input parameters, into a desired action that the lighting system can be directed (e.g., controlled) to perform. Generating control instructions based on the input can also function to transform the relative position of an input at the virtual representation and/or control region of the virtual input region into a physical position of a light emitter of a light emitting unit (e.g., mapping), to provide spatially-resolved lighting control of the lighting system by the client application. The control instructions can be generated by the application (e.g., client), a remote server 170, the lighting system, and/or elements of the lighting system (e.g., the lighting system unit). Control instructions can include color selection settings for the light emitting unit, color selection settings of the lighting system unit, color selection settings for the lighting system or color selection settings for any suitable portion(s) of the lighting system. Color selection settings can include any one or combination of: hue, intensity, saturation, gradient, color temperature, brightness, or any other suitable setting. The control instructions are preferably generated by mapping the input parameter values to lighting system parameter values, but can additionally or alternatively include computing, transmitting, interpreting, or any other suitable transmutation of an input into control instructions. Mapping the input parameter values to lighting system parameter values can include determining a map (or a mapping), and applying the determined map to the received input to produce the control instructions. However, the inputs can be otherwise mapped to lighting system parameters.

Determining a mapping functions to determine the correspondence between virtual positions at the virtual input region and/or virtual representation of the lighting system to physical positions of light emitters of the lighting system. A map preferably relates predefined control regions of the virtual input region to predefined zones of the light emitting unit(s); such a map is preferably 1:1, but can alternatively be any suitable mapping. Additionally or alternatively, the mapping may be scaled (e.g., one control region maps to multiple zones of the light emitting unit) or calculated (i.e., not necessarily predefined); for example, the mapping between the control regions and the zones can be calculated (computed) based on what devices are connected to the client application. Determining can include retrieving (e.g., from a user device, a cloud server, a lighting system, a light system unit, etc.). Determining the mapping can additionally or alternatively include generating the mapping; for example, by "pinging" surroundings to locate and/or identify available devices and dynamically adjusting the map based on what devices are available and/or connected. In one variation, the mapping is an indexing scheme, such as that discussed above.

For modular lighting systems having more than one lighting system unit, the mapping between the graphical representation and the physical layout can update dynamically as additional lighting system units are physically and/or communicatively coupled to the lighting system. The graphical representation can stay substantially similar (e.g., occupy the same physical extent at the virtual input region) but represent an increasing amount of physical space as units are added; alternatively, the graphical representation can increase in extent or otherwise change shape as additional lighting system units are added.

In one variation, determining the mapping includes grouping portions of the lighting system into zones. When the lighting system includes multiple lighting system units, each lighting system unit can be grouped into a zone and thus controlled independently. Zones can additionally or alternatively be grouped at the light emitting unit of a lighting system unit; for example, if the light emitting unit includes a plurality of light emitters, the plurality of light emitters can be subdivided (grouped) into controllable zones. Additionally or alternatively, any other suitable grouping of light emitters among the total collection of light emitting units, lighting system units, and the lighting system can be included in determining the map. Grouping is preferably performed by the user at a client application; for example, a user can group control regions together at the virtual input region (e.g., by encircling them using a touch gesture), which dynamically updates the mapping between control regions and physical regions of the lighting system based on the grouping. In another specific example, the beginning and end of a user touch gesture at the virtual input region (e.g., at the graphical representation of the system) sets the limits of a control region. Determining the mapping in this specific example then further includes determining which light emitters and/or light emitting units are located within the control region thus defined, and then mapping the control region to the determined light emitters and/or light emitting units.

In a specific example, determining the mapping can include adjusting the light emitter color settings to emulate a continuous gradient (as selected at the virtual input region and displayed at the graphical representation) using discrete light emitters (e.g., by dividing the continuous gradient into discrete control regions, each control region corresponding to a light emitter, and emitting light with properties corresponding to the average of the properties across the control region).

Figure 4:
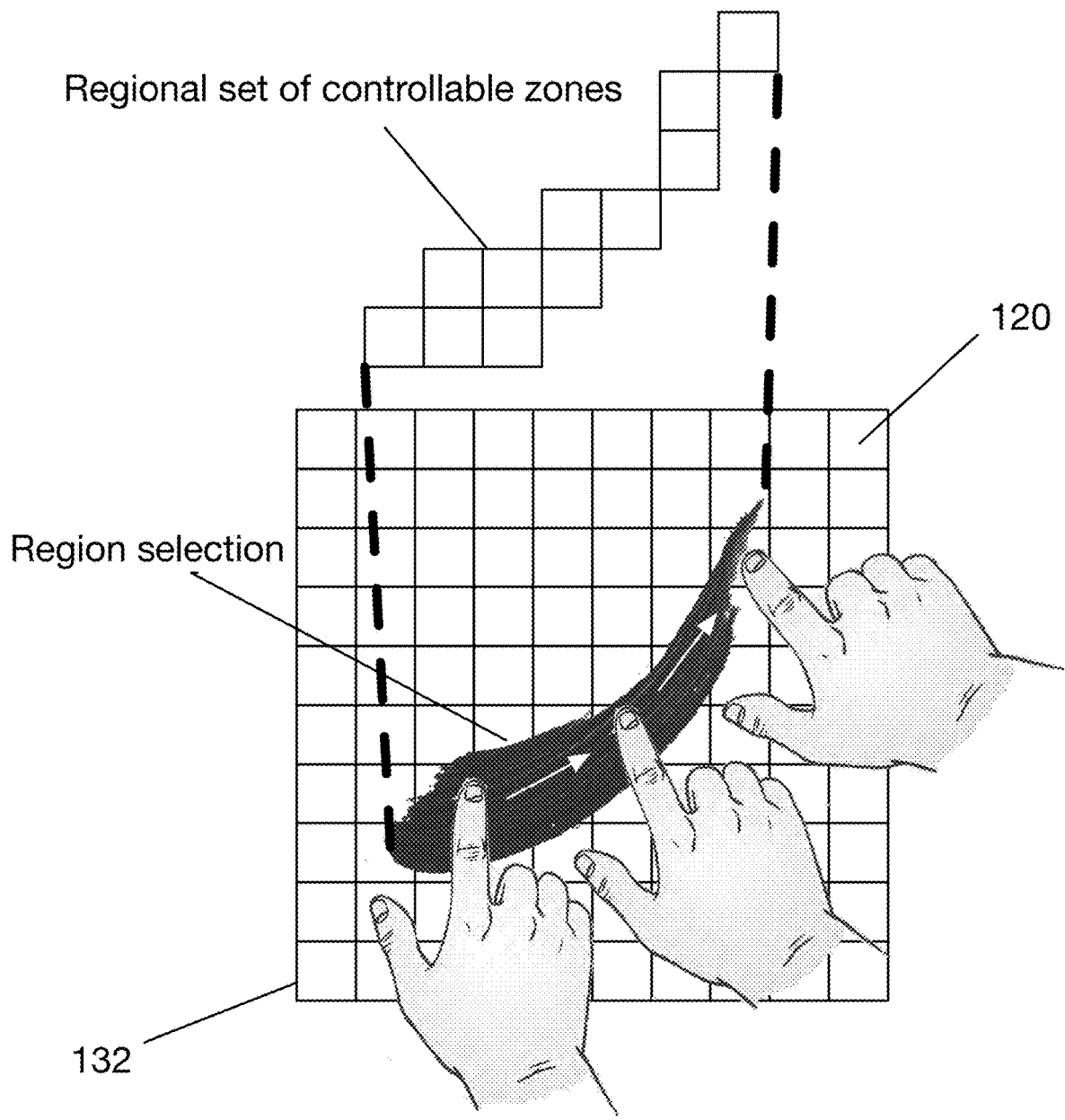
FIG. 4 is an example of a region selection on a touch-sensitive surface of the lighting system.

The method of the mapping preferably includes defining a regional set of controllable zones (e.g. as shown in FIG. 4), wherein the regional set of controllable zones is defined to be the set of controllable zones to which the regional selection has been mapped, based on any of the mapping methods described previously. Alternatively, any other suitable mapping method may be used to determine the regional set of controllable zones. In one variation, the mapping method further includes a set of thresholds, wherein the thresholds are used to determine which controllable zones should assigned to the regional set of controllable zones, in the case that the region selection is mapped to only a portion of a certain controllable zone. For example, if less than 50% of the light emitters in a controllable zone are mapped to the region selection, that controllable zone may not be included in the regional set of controllable zones.

The method can additionally or alternatively include assigning of a color selection to a region selection, based on a mapping. Preferably, the color selection is assigned to all the light emitters in the regional set of controllable zones determined from the region selection. Alternatively, the color selection may be assigned to a subset of the light emitters in a regional set of controllable zones, such as all the light emitters forming the border of a controllable zone.

The method can additionally or alternatively include arbitrating conflicting instructions, wherein a color selection input is chosen from a set of color selection inputs. In one example, a first color selection input is received from one source (e.g. a touch screen), and a second color selection input is received from a different source (e.g. an application on a mobile device). Alternatively, the color selection inputs may be received from the same source. Preferably, the color selection inputs are received at different times; alternatively, they may be received at the same time. In the example, a single color selection from the set of first and second color selections is chosen, based on which color selection was received later in time. Alternatively, any other selection process (e.g. which color selection has a lower intensity, which color selection was received from a touch screen, etc.) may be used in the arbitration step. An arbitration step may similarly be used to choose a region selection, or any other form of input to the lighting system.

The method can additionally or alternatively include automatically adjusting color parameters assigned to (and displayed at) light emitting units and light emitters thereof. Color parameters (color settings) that can be adjusted include hue, saturation, intensity, and other suitable color parameters. Color parameters can be adjusted based on the type of lighting system and/or lighting system unit, as well as the number of lighting system units of the lighting system. Color parameters can additionally or alternatively be adjusted based on color parameters assigned to adjacent or associated virtual regions (e.g., a smoothly-varying color gradient can be added between user-selected colors along a linear virtual representation of the lighting system). Color parameters can additionally or alternatively be adjusted based on a "scene" selected at the virtual input region (e.g., selection of a "forest scene" can apply a green tint to the color settings of desired lighting system units).

In a first variation, automatically adjusting color parameters can include color blending (e.g., color hue blending). Color blending includes automatically and/or algorithmically adding blending of a color parameter (e.g., hue) to create aesthetically pleasing transitions between user-selected (or otherwise generated) colors, either at the graphical representation of the system, the lighting system, or both. Added color(s) can be automatically determined using the canonical color wheel (e.g., yellow hues are added between green and red), or by any other suitable manner. For example, if a red swatch is dragged by the user into a green region of the graphical representation, yellow hue blending can be automatically added to either side of the red swatch. This can be performed solely at the graphical representation, solely at the lighting system (via the mapping between the graphical representation and the lighting system), or both. In variations, the client application renders an abstraction of the hue blending feature instead of the hue blending itself (e.g., a displayed box titled "hue blending" is checked at the application to enable hue blending, but the blended hues are not visible in the graphical representation). The color parameters can be blended using: an average (e.g., weighted average, wherein different color values or spatial positions have different weights, wherein the weights are randomly determined, etc.), a logarithmic function, a learned equation (e.g., based on user preferences and/or adjustments), or any other suitable blending method.

In one variation of color blending (e.g. as shown in FIGS. 15A-15D), a color blending algorithm is implemented to perform any or all of the following: identifying a first controllable zone having a first assigned color selection in a virtual representation, identifying a second controllable zone having a second assigned color selection in the virtual representation, determining an edge controllable zone in the virtual representation, wherein the edge controllable zone is located between the first and second controllable zones when the first controllable zone is non-adjacent with the second controllable zone and wherein the edge controllable zone is the second controllable zone when the first controllable zone is adjacent with the second controllable zone, and assigning a blended color selection to the virtual representation of the edge controllable zone wherein the edge color selection includes an averaged color hue between the first color selection and the second color selection.

In a second variation of color blending (e.g. as shown in FIGS. 16A-16D), a color blending algorithm is implemented to perform any or all of the following: select a first controllable zone having a first assigned color selection in a virtual representation, select a second controllable zone having a second assigned color selection in a virtual representation, wherein the second controllable zone is located a predetermined number of controllable zones away from the first controllable zone (e.g., 1, 2, 3, or any suitable number of zones away from the first zone), and assigning a blended color selection to one or more of the controllable zones between the first and second controllable zones in the virtual representation. Alternatively, the blended color selection may be assigned to one or both of the first and second controllable zones in the virtual representation. In further alternative variations, the number of controllable zones separating the first and second controllable zones in the virtual representation is not predetermined; in some variations, the number is dynamic (e.g., based on the input speed, length, duration, etc.), based on user input, or otherwise determined. Preferably, the first and second controllable zones are arranged in the same row or other axis of the virtual representation of a lighting system unit. Alternatively, the first and second controllable zones are arranged in the same column, in neither the same column nor the same row, in different lighting system units, in different lighting systems, or otherwise arranged.

Alternatively, any other method for blending colors in a lighting system may be used. In some variations, a light property other than color hue may be altered in the color blending process, such as, but not limited to, saturation, intensity, tint, etc. In some variations, multiple light properties are adjusted during the color blending process. Preferably, the first controllable zone is the controllable zone having the lowest index number in the lighting system. Alternatively, the first controllable zone is the most recent controllable zone in the virtual representation to have received a color selection. In some variations, the first controllable zone is a predetermined assignment in the virtual representation. Alternatively, the user may select the first controllable zone. Further alternatively, the first controllable zone may be determined in any other way. In some variations, one or both of the first and second controllable zones are regional sets of controllable zones. Alternatively, the first and second controllable zones are single light emitters, single lighting system units, other groupings of light emitters, or any other set of lighting system elements. Preferably, the averaged color hue is an exact average in color hue between the first and second controllable zones. Alternatively, color thresholds may be incorporated into the color blending algorithms, wherein the color thresholds specify how the averaged color hue is determined. For example, the blended color may determined from the set of color selections using a weighted average, a logarithmic function, or any other function. In some variations, there is a third controllable zone included in the color blending process. Alternatively, any number of controllable zones may be included. In some variations, multiple color blending processes are performed, preferably with a directionality, such as from left to right across a row of a lighting system unit. In some variations, these multiple color blending processes are performed in parallel, otherwise they may be performed in series. In some variations, one series of blending process is performed having a first directionality and a second series of blending processes is performed having a second directionality. For example, one series of blending processes may be performed from left to right across lighting system unit, while a second series of blending processes is performed from top to bottom. In some variations, these series are performed sequentially; alternatively, they may be performed at different times, or in any other way. In some variations, blending processes are performed across a three-dimensional arrangement of controllable zones.

Controlling the lighting system based on the control instructions S130 functions to actualize the desired behavior of the lighting system. Controlling can include turning "on" or "off" various portions of the lighting system, changing the emitted color properties of various portions of the lighting system, animating the output light, or any other suitable controllable features.

In a first variation, controlling the lighting system includes controlling lighting elements based on the determined mapping between the graphical representation and the physical layout. This can include computing the color to be displayed by each adjacent light emitter to accurately represent the displayed graphical representation.

Figure 17:
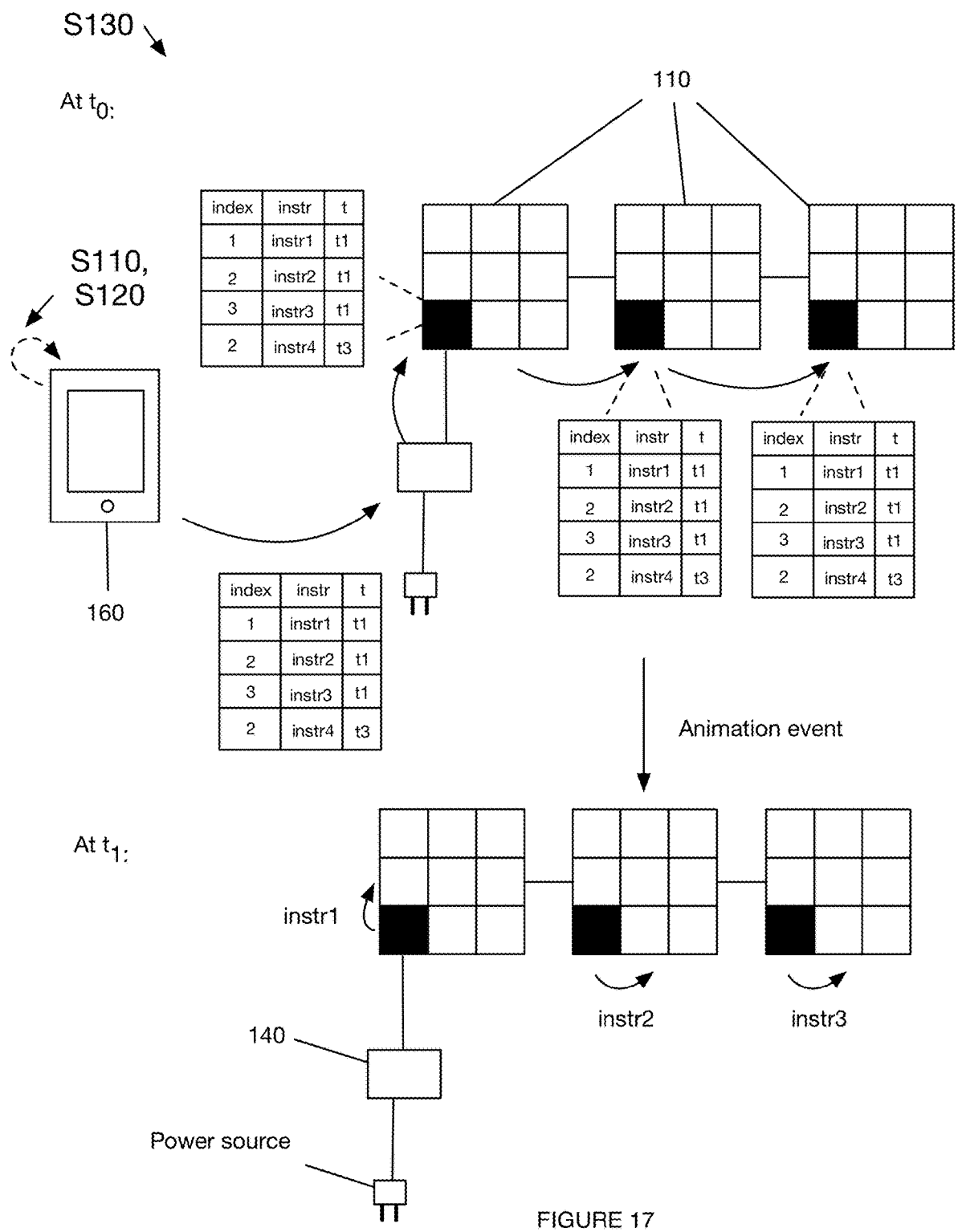
FIG. 17 is an example implementation of double buffered zone animation.

Controlling the lighting system can include maintaining a real-time correspondence between the input at the virtual input region and the output at the lighting system. Alternatively, the lighting system can maintain no correspondence between the input at the virtual input region and the output at the lighting system, maintain correspondence in non-real time, or in any other suitable manner. In one variation, real-time control of the lighting system is implemented with a double-buffered zone animation protocol (e.g. as shown in FIG. 17), which functions to maximize animation smoothness and color change synchronization. Double-buffered zone animation is preferably implemented during times of high network traffic and/or lag, wherein some instructions in an incremental instruction set do not reach the assigned lighting system endpoint (e.g. control module), but can alternatively be implemented at any suitable time. Applying a double-buffered zone animation protocol preferably includes any or all of the following steps: receiving an instruction at a lighting system endpoint, generating control instructions for each controllable zone based on the instruction, formatting the control instructions into a set of packets, transmitting each packet of the set to the lighting system endpoint (e.g., over a wired or wireless connection, such as WiFi), buffering the instruction at the lighting system endpoint, detecting an execution event at the lighting system endpoint (e.g., an animation event; receiving a command, such as an 'animate' message; satisfaction of a predetermined timestamp, etc.), verifying that all instructions corresponding to said command have been received (e.g., using a checksum method or any other suitable method) after or before, and executing all instructions corresponding to said command concurrently. Preferably, the lighting system endpoint is a control submodule of a lighting system unit (e.g., local controller of a lighting system unit, controller of the lighting element device, etc.); alternatively, it may be any control module in the lighting system or in an application associated with a user device. In one variation, the control instructions can be stored at the master control module (e.g., client executing on the user device, lighting element device controller, etc.) and at the local controllers of the lighting system units, wherein the lighting system units synchronously execute the control instructions upon animation event detection. However, the control instructions can be otherwise buffered and executed. Preferably, the lighting endpoint has on-board memory/local memory; alternatively, any other memory, such as memory associated with a remote server 170, may be used. In one variation, the instruction is received at a lighting system endpoint in real-time. Alternatively, the instruction may be received in near real-time, after a user has designated an instruction to be transmitted, or at any other time. The buffering process is preferably prescribed by an algorithm on a control module of the lighting system, but can alternatively be prescribed by any other source, such as, but not limited to, another local controller (e.g. the processor in a user device), a remote server 170 (e.g. the controller), etc.

The method can optionally include receiving user input at the lighting system, which functions to enable control of the lighting system, using elements of the lighting system itself. Receiving user input at the lighting system is preferably performed at a system input, but can alternatively be performed by any suitable element of the lighting system. Receiving user input at the lighting system can include: rendering a color palette at a lighting system unit, receiving a user input at the input that selects one or more colors from the color palette, and updating the virtual input region with the selected color(s). In a specific example, the lighting system unit includes a touch-sensitive display, and the user input is received as a touch input to the display. The resultant color pattern (e.g., parameters thereof) can optionally be transmitted to a user device (e.g., in real- or near-real time, asynchronously, etc.), wherein the user device can render a virtual representation of the lighting system (e.g., in the virtual input region) with the same color pattern. However, inputs received by the lighting system can be otherwise used.

The method can optionally include storing system state data, which functions to retain parameters describing the state of the lighting system. Storing system state data can enable replication of the stored system state by the lighting system. Storing system state data can be performed on the client (user) device, on a remote server 170, or at any suitable computing system that includes data storage. In a first variation, storing system state data can include receiving a user input at the user interface that saves the system state of the lighting system to a new "scene"; this scene can thus be recreated at the lighting system through retrieval of the stored system state.

The method can be performed in whole or in part by a native application on a user device, but can alternatively be performed by a remote computing system, by a browser application on a user device, by an application executing on the controller of the lighting element device and/or lighting system unit, or by any other suitable apparatus. The user device is preferably a mobile device associated with the user, including mobile phones, laptops, smartphones, tablets, or any other suitable mobile device. The user device is preferably connected to the server, wherein the connection is preferably a wireless connection, such as Wi-Fi, a cellular network service, or any other suitable wireless connection, a near field connection, such as radiofrequency, Bluetooth, or any other suitable near field communication connection, or a wired connection, such as a LAN line. The user device can additionally or alternatively function as the server, such as in a distributed network system. The method can be performed by one or more servers, wherein the servers can be stateless, stateful, or have any other suitable configuration or property.

Although omitted for conciseness, the preferred embodiments include every combination and permutation of the various system components and the various method processes, wherein the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

We claim:

1. A system for displaying colored light, the system comprising:
    a lighting system, the lighting system comprising a plurality of light emitters arranged in a set of controllable zones;
    a client application, wherein the client application:
        receives a set of region selections;
        receives a set of color selections associated with the set of region selections;
    a processing system, wherein the processing system:
        maps each region selection to a subset of the set of controllable zones of the lighting system, thereby defining a regional set of controllable zones;
        assigns the set of color selections to the regional set of controllable zones;
        identifies a plurality of light emitters within the lighting system assigned to the regional set of controllable zones; and
        controls the light emitters based on the color selection assignments.

2. The system of claim 1, wherein the client application is in communication with a touch-sensitive surface.

3. The system of claim 2, wherein the set of region selections is received from the touch-sensitive surface.

4. The system of claim 3, wherein the set of region selections is determined based on a finger swipe of the user detected at the touch-sensitive surface.

5. The system of claim 3, wherein the touch-sensitive surface is remote from the lighting system.

6. The system of claim 1, wherein at least a portion of the processing system is arranged onboard the lighting system.

7. The system of claim 6, wherein a second portion of the processing system is arranged remote from the lighting system.

8. The system of claim 1, wherein the client application is further configured to receive an animation designation from the user, wherein the animation designation prescribes a dynamic pattern for controlling the light emitters.

9. The system of claim 1, wherein the lighting system is a modular lighting system comprising multiple lighting units, wherein the plurality of light emitters is arranged among the multiple lighting units.

10. The system of claim 9, wherein the processing system is further configured to determine a layout of the modular lighting system.

11. The system of claim 10, wherein the client application is further configured to receive an animation designation from the user, and wherein the processing system is further configured to prescribe an animation pattern to the multiple lighting units based on the layout.

12. The system of claim 10, wherein the client application is further configured to present a virtual representation of the layout.

13. A method for displaying colored light at a lighting system, the method comprising:
receiving a set of region selections;
receiving a set of color selections associated with the set of region selections;
mapping each of the set of region selections to a set of controllable zones of the lighting system, thereby defining a regional set of controllable zones;
assigning the set of color selections to the regional set of controllable zones;
identifying light emitters within the lighting system assigned to each of the regional set of controllable zones; and
controlling the light emitters based on the set of color selection assignments and the set of color assignments.

14. The method of claim 13, wherein receiving the set of region selections comprises receiving the set of region selections from a touch-sensitive surface.

15. The method of claim 14, wherein the set of region selections is determined based on a finger swipe of a user detected at the touch-sensitive surface.

16. The method of claim 13, wherein the set of region selections and the set of color selections are received from a client application executing on a user device.

17. The method of claim 13, further comprising receiving an animation designation from a user, wherein the animation designation prescribes a dynamic pattern for controlling the light emitters.

18. The method of claim 13, wherein the lighting system is a modular lighting system comprising multiple lighting units, wherein the light emitters are distributed among the multiple lighting units.

19. The method of claim 18, further comprising determining a layout associated with the multiple lighting units.

20. The method of claim 19, further comprising receiving an animation designation from a user and prescribing a dynamic pattern for controlling the light emitters, wherein the dynamic pattern is determined based on the animation designation and the layout.

* * * * *